INVENTOR
W. R. HARRY
BY [signature]
ATTORNEY

Dec. 4, 1962 W. R. HARRY 3,066,633

SIGNAL TRANSLATING SYSTEMS

Filed Dec. 27, 1945 7 Sheets-Sheet 2

INVENTOR
W. R. HARRY
BY [signature]
ATTORNEY

SIGNAL TRANSLATING SYSTEMS

Filed Dec. 27, 1945 7 Sheets-Sheet 3

INVENTOR
W. R. HARRY
BY
[signature]
ATTORNEY

Dec. 4, 1962 W. R. HARRY 3,066,633
SIGNAL TRANSLATING SYSTEMS
Filed Dec. 27, 1945 7 Sheets-Sheet 4

INVENTOR
W. R. HARRY
BY
ATTORNEY

Dec. 4, 1962 W. R. HARRY 3,066,633

SIGNAL TRANSLATING SYSTEMS

Filed Dec. 27, 1945 7 Sheets-Sheet 5

INVENTOR
W. R. HARRY
BY [signature]
ATTORNEY

INVENTOR
W. R. HARRY
BY
[signature]
ATTORNEY

Dec. 4, 1962 W. R. HARRY 3,066,633

SIGNAL TRANSLATING SYSTEMS

Filed Dec. 27, 1945 7 Sheets-Sheet 7

INVENTOR
W. R. HARRY

BY [signature]

ATTORNEY

United States Patent Office 3,066,633
Patented Dec. 4, 1962

3,066,633
SIGNAL TRANSLATING SYSTEMS

William R. Harry, Summit, N.J., assignor to Bell Telephone Laboratories, Incorporated, New York, N.Y., a corporation of New York Filed Dec. 27, 1945, Ser. No. 637,411
38 Claims. (Cl. 114—23)

This invention relates to signal translating systems and more particularly to signal responsive steering systems. More specifically, this invention relates to echo ranging systems especially suitable for the steering control of moving bodies such as torpedoes.

One general object of this invention is to improve the reliability and performance of signal translating systems, particularly of such systems of the echo ranging type.

Another general object of this invention is to increase the accuracy of control by steering systems for moving bodies and more particularly of echo ranging type steering control circuits for torpedoes.

More specifically, objects of this invention are to:

Effectively eliminate from the output of an echo ranging system the components due to reverberation without substantially affecting the components thereof due to echoes;

Resolve the signals received at the transducer of an echo ranging system into a control signal of amplitude accurately indicative of the bearing, relative to the transducer, of the source of the received signals;

Enable presetting of a directionally responsive signal translating system, particularly of an echo ranging system, so that the system, in effect, will respond only to the received signal emanating from the point or region furthest to one side, e.g. left or right, of the input element for the system, when two or more signals are received at that element from different directions;

Improve the correction in accordance with a control signal, of the steering member in a steering system for a moving body, and more particularly of the rudder in a torpedo steering system including a gyroscope control, to guide the body or torpedo along other than a preassigned, e.g. gyroscope, course;

Realize proportional steering in an echo ranging type torpedo steering system including a gyroscope control;

Effectively prevent false steering of a torpedo having such a system, as by an echo emanating from other than the target, e.g. from a foreign object in the echo ranging field of the system, explosive counter mining or spurious underwater noise peaks.

Prevent loss of steering information, in such a torpedo, from an echo received very late in the signal receiving portion of the echo ranging cycle; and Assure and expedite the attainment of an accurate length for pulses propagated in an echo ranging system.

In one illustrative embodiment of this invention, a torpedo comprises a rudder, means for deflecting the rudder, a control for determining the direction and extent of torpedo turn by initial deflection of the rudder, and a supersonic underwater echo ranging system. The control may include a gyroscope and associated cover of basically conventional construction, which, as is known, effects deflection or turning of the torpedo proportionately to the relative angular relation of the cover and the gyroscope axis. The echo ranging system includes a transducer having two similar portions so related spatially that, for signals received thereby of the operating frequency, or within the operating frequency range, the relative phase of the outputs of the two portions is determined by the magnitude and sign of the bearing, relative to the torpedo, of the object or region from which the received signals emanate. The two transducer portions serve both as propagating and receiving elements and are controlled to propagate supersonic signal pulses of preassigned length or duration and recurrence rate and to respond to echoes received at the transducer during the interval between successive pulsing cycles.

The two transducer portions constitute the input elements for respective similar receiver channels and supply to these channels, during the interval between successive pulsing periods, such reverberation and echo signals as are received thereby. Means are provided for resolving the outputs of the two channels in combination into a control or resultant signal of amplitude and polarity determined by the relative phase of the outputs of the two transducer portions.

Each receiver channel includes an amplifier provided with unidirectional automatic gain control of the resistance-condenser type which varies the amplifier gain following each pulsing period, in such manner that the level of the reverberation component of the amplifier output is maintained substantially constant, the gain control being so constructed and arranged that variation in gain ceases when an echo signal is received and resumes following translation of the signal.

In accordance with one feature of this invention, means are provided in association with the gain control circuit for assuring prompt resumption of gain controlling action following receipt of an echo signal whereby a relatively weak echo following a relatively strong echo will be translated with proper intensity.

In accordance with another feature of this invention, means are provided in the receiver channels for substantially eliminating such amplitude differences as may occur between corresponding echo signals in the two channels and for eliminating also reverberation signal components whereby the outputs of the two channels differ essentially only in phase, the difference being determined by the relative phase of the outputs of the two portions of the transducer.

In accordance with a further feature of this invention, means are provided in association with the circuit portion wherein the outputs of the two channels are resolved into a resultant or control signal, constructed and arranged so that when two or more echoes are received between successive pulsing periods, the resultant or control signal will be determined only by the echo emanating from the object or region furthest to one side or the other of the transducer. More specifically, in accordance with this feature of the invention, means are provided in association with the resolving circuit so that, in effect, as between echoes emanating from a target ship and its wake, the ship echoes will be selected to provide the resultant or control signal and the wake echoes will be disregarded.

In accordance with still another feature of this invention, the resultant or control signal aforementioned is utilized to produce course correction by effecting rotation of the gyroscope cover in accordance with this signal.

In accordance with a still further feature of the invention, means are provided in association with the gyroscope cover for producing a second signal tending to balance the aforementioned control signal, the second signal increasing proportionately to the angle of cover rotation, whereby proportional steering is obtained.

In accordance with still another feature of this invention, the portion of the control circuit for affecting cover correction in accordance with the control or resultant signal above-noted is constructed and arranged so that in the event no echo signal is received in the interval following one in which such a signal was received, the torpedo will be returned to its initial gyroscope course.

In accordance with still another feature of this invention the portion of the control circuit noted in the next preceding paragraph is further constructed and arranged so that in the event an echo is received late in the interval between successive pulsing cycles, initiation of the cycle of operations whereby the circuit is conditioned for translation of another echo is delayed until the late received echo has been resolved into a resultant signal.

In accordance with a still further feature of this invention, the energizing circuit for the transducer, when operated as a projector, includes a source, such as an electronic oscillation generator, which is keyed by an unsymmetrical vibrator, the multivibrator including a relay which determines the length or duration of the keying pulse, and hence of the propagated pulse, by control of the electronic constants of the vibrator.

The invention and the above-noted and other features thereof will be understood more clearly and fully from the following detailed description with reference to the accompanying drawing in which:

FIG. 1 is a functional schematic of a portion of a torpedo steering system illustrative of one embodiment of this invention, this portion comprising the transducer, oscillator, timer and receiver circuit for converting the output of the transducer, when operated as a receiver, into a steering control signal;

FIGS. 1A to 1H and 1J to 1N, both inclusive, are graphs illustrating the character of the signals at various points in the portion of the system shown in FIG. 1 and the transmission characteristics of components of this portion;

Figures 1, 1A, 1B, 1C, 1D, 1E, 1F, 1G, 1H, 1J, 1K, 1L, 1M, 1N:
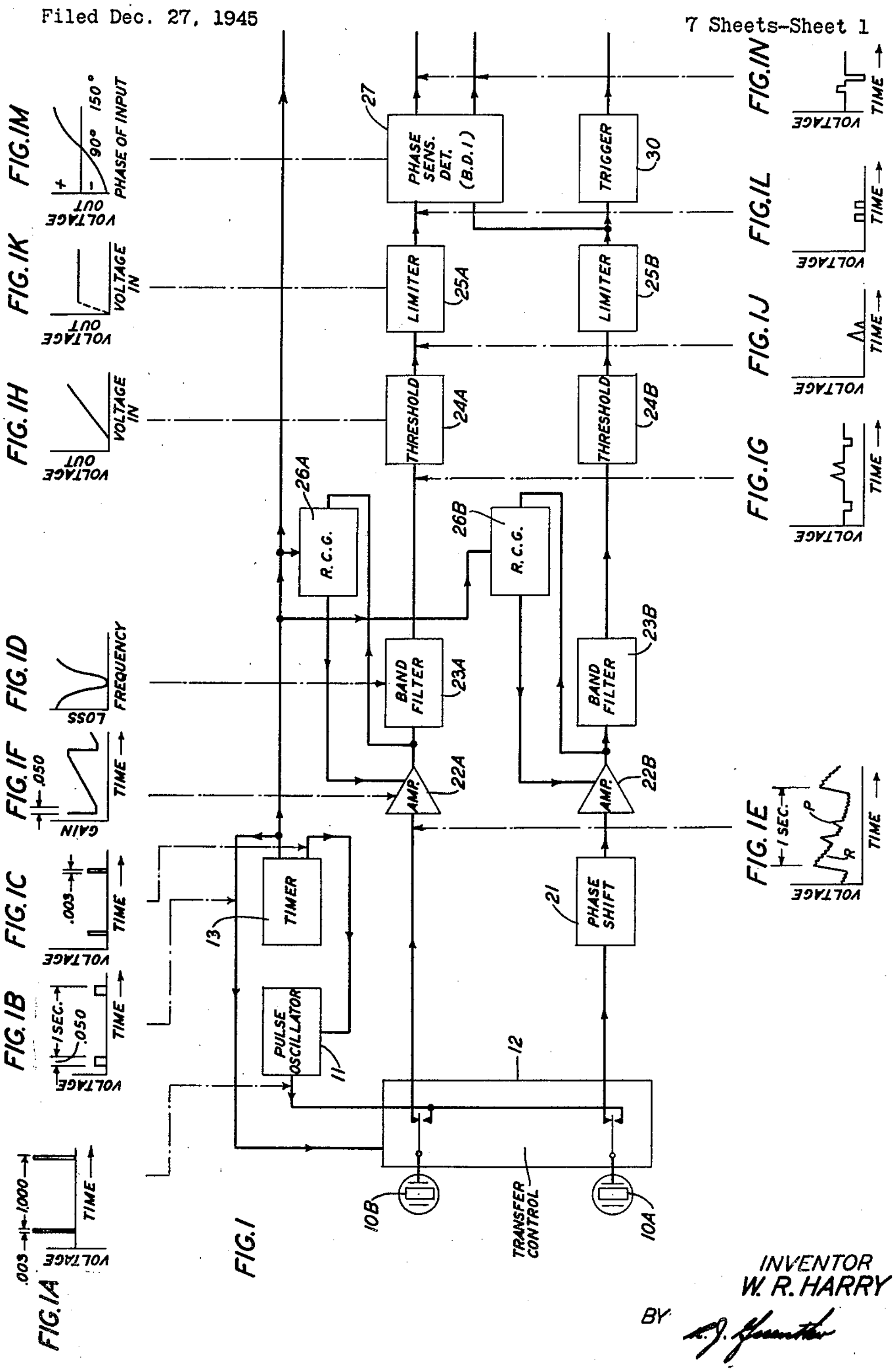

Referring now to the drawing, the torpedo steering system therein illustrated comprises, generally, as shown in FIG. 1, a submarine signal transducer 10A, 10B operable as both a projector and receiver of supersonic compressional waves, an oscillator 11 for producing signals of a preassigned supersonic frequency, a receiver system, a transfer control 12 for associating the transducer with either the oscillator or receiver system, and a timer 13 which controls the oscillator and transfer control so that the transducer is energized by the oscillator to propagate signal pulses of prescribed duration and periodicity and is associated operatively with the receiver circuit for a prescribed interval following the propagation of each pulse, whereby reverberation and echoes of the pulse detected by the transducer during this interval are translated into signals applied to the receiver system.

The receiver system comprises an amplifier and associated signal translating devices of character described in detail hereinafter, and a detector or bearing deviation indicator, illustrated schematically in FIG. 1, which respectively suppress the reverberation components of the signals detected by the transducer and pass the echo components, and resolve the echo signal components into a voltage of amplitude and polarity determined by the magnitude and sign respectively of the horizontal angle between the longitudinal axis of the torpedo and the region or target at which the received echoes originate.

Figure 2:
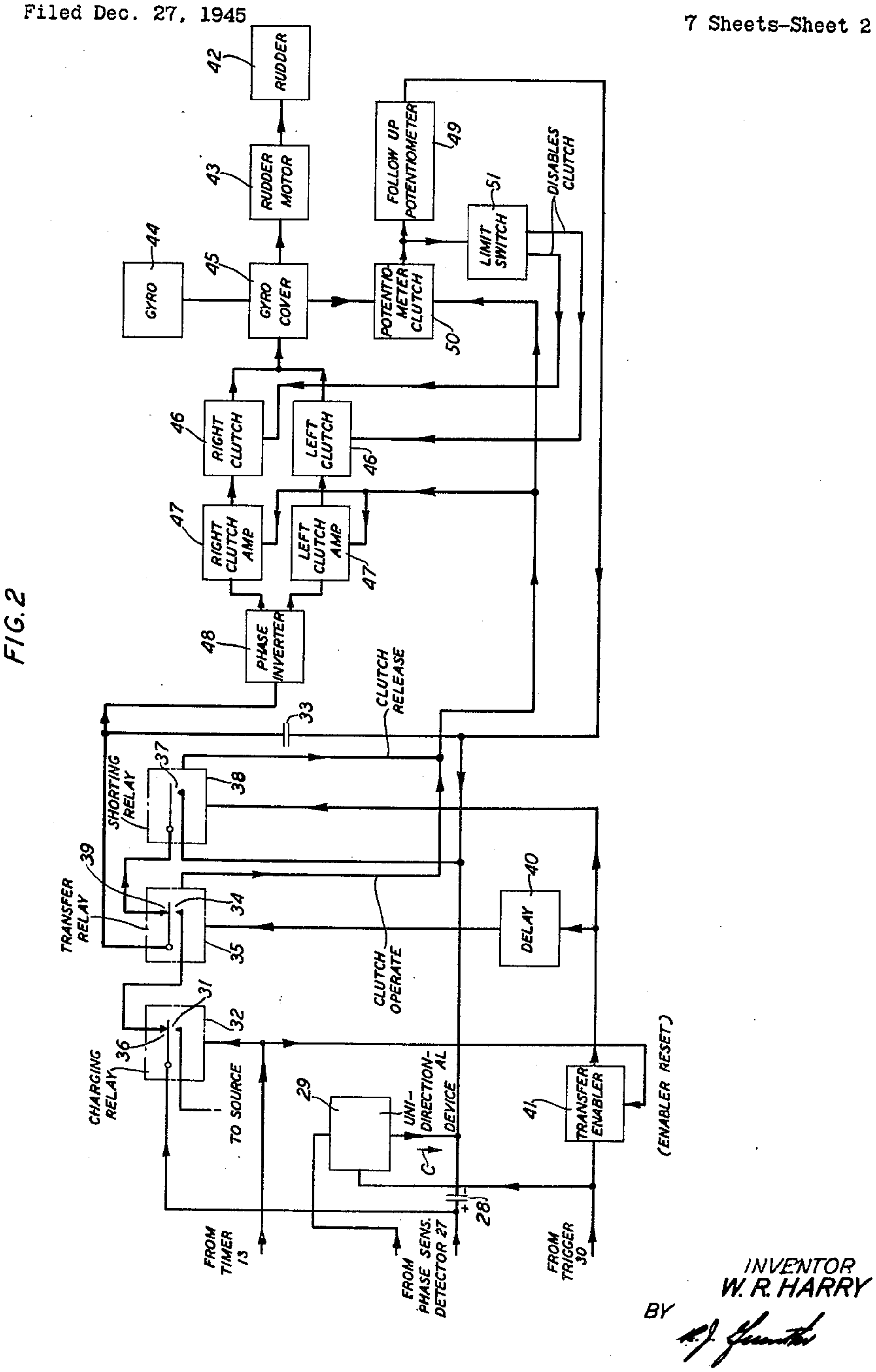
FIG. 2 is a functional schematic of another portion of a torpedo stering system illustrative of this invention, specifically of the portion for effecting deflection of the rudder in accordance with control signals produced by the portion illustrated in FIG. 1.

This voltage is applied to a directional translator, illustrated schematically in FIG. 2, which functions to convert the voltage into a control signal and also to eliminate ambiguity due to echoes from two different directions, e.g. from a target ship and its wake.

The control signals are applied to a rudder control system, also illustrated in FIG. 2, which serves to control the rudder in accordance with the control signals, to turn the torpedo toward the target. The rudder control system includes a follow-up control for providing proportional steering.

Figure 3:
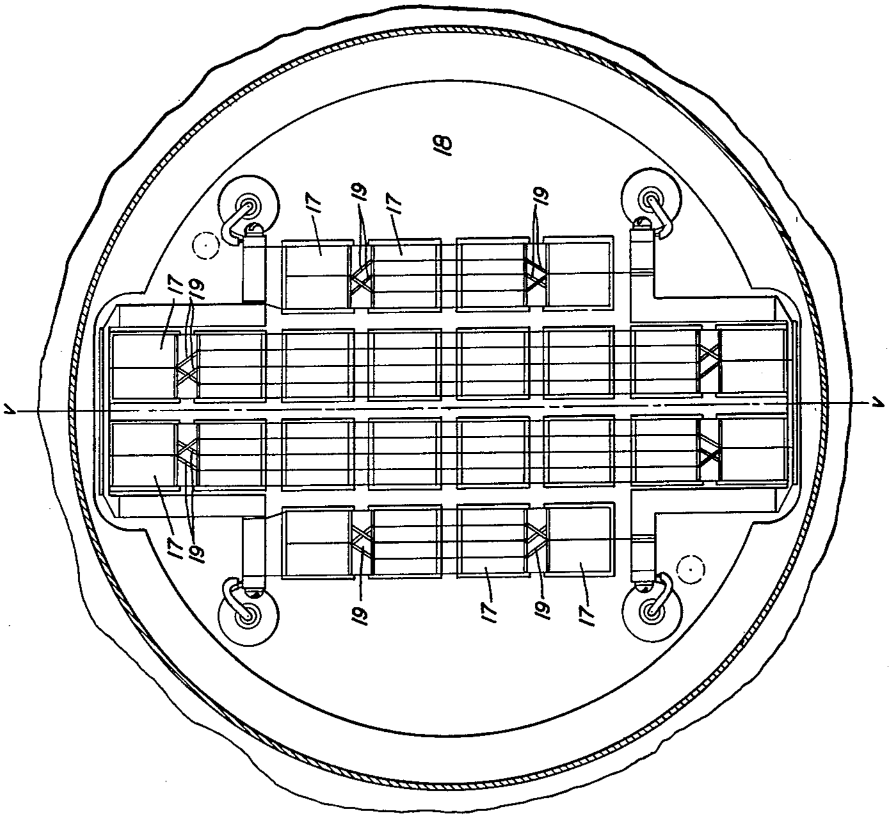
FIGS. 3 and 4 are front and side views respectively of the submarine signal transducer included in the system illustrated in FIG. 1, portions of the transducer housing being broken away in both figures to show internal details.
Figure 4:
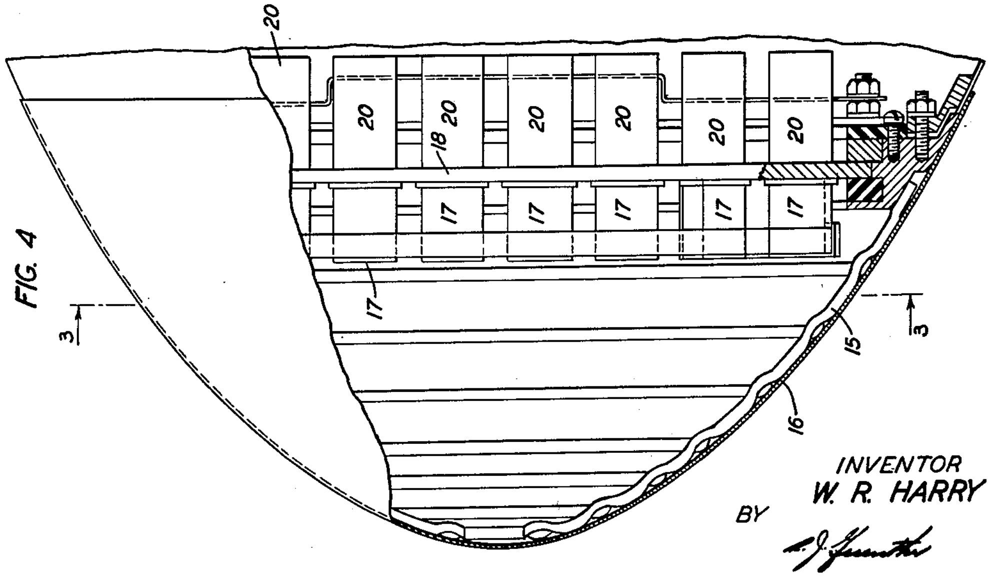

The transducer, details of which are shown in FIGS. 3 and 4, comprises a piezoelectric crystal and resonator assembly mounted within a streamlined dome or housing in turn mounted on the nose portion of the torpedo and aligned with the longitudinal axis of the torpedo. The dome includes a reticulated framework 15, for example of expanded metal, to which there is secured a cover 16 of a material transparent to supersonic compressional waves.

The piezoelectric crystals 17 are mounted upon a plate 18 and, as shown in FIG. 3, are positioned to define an array or blanket. Each crystal includes two or more crystal slabs electrically in parallel, the end crystals in each vertical row being composed of a lesser number of slabs than the intermediate crystals and the vertical rows being of greater extent than the horizontal rows to provide directional propagation and response patterns of a character noted hereinafter. Electrically the array is divided into two similar groups of crystals to the left and the right of the vertical axis V—V in FIG. 3, which axis lies in the vertical median plane of the torpedo, the crystals of each group being connected in parallel by suitable conductors 19, and the two groups are spaced an effective center-to-center distance substantially equal to the wavelength of the prescribed operating supersonic frequency. When the transducer is operated as a projector, the two groups of crystals are energized in parallel; when it is utilized as a receiver, the two groups are operated independently.

Carried by the mounting plate 18 are a plurality of resonators 20, one for each crystal and aligned therewith, each crystal and associated resonator being constructed and arranged to define a longitudinally vibratile system of length substantially equal to one-half wavelength of the prescribed operating frequency and having a vibrational node at substantially the mounting plate. The chamber between the mounting plate and the dome or housing is filled with an air-free fluid having substantially the same transmission characteristics for supersonic compressional waves as sea water. Deaerated castor oil is illustrative of such fluid.

Because of the construction and arrangement of the crystals, the array as a whole and also each of the two groups of crystals is markedly directional in both the vertical and horizontal dimensions. For example, the crystals may be constructed and arranged so that for the array as a whole the effective included angles of the primary lobes in the horizontal and vertical directivity patterns are of the order of 36 and 20 degrees respectively and these angles for each of the two groups of crystals are of the order of 80 degrees and 20 degrees respectively.

Also, because of the spacing of the two groups as noted heretofore, when the transducer is utilized for receiving, a phase difference between the output voltages of the two groups, dependent upon the angle of incidence of the received signals, obtains. Thus, the phase difference between echo signals provides indicia of the magnitude and sign of the horizontal angle between the longitudinal axis of the torpedo and the target or region from which the echoes emanate.

The transducer normally is associated with the receiver by the transfer control 12 and is dissociated therefrom and coupled to the oscillator 11 periodically for periods of prescribed duration by the timer element 13. The oscillator may be, for example, an electronic supersonic oscillator of the class C type normally biased so that it is disabled. The timer, which may be, for example, one or more multivibrators, controls the transfer 12 to transfer the transducer from the receiver to the projector for periods of fixed length and at a preassigned frequency, and controls the oscillator so that it is enabled during each period in which the transducer is coupled to the oscillator. In a specific system, the timer is constructed and arranged so that the transducer is associated with the oscillator for periods of 50-milliseconds duration at one second intervals and the oscillator is enabled for three milliseconds during each of these periods. Thus, three-millisecond signal pulses of the prescribed operating frequency are projected by the transducer at one second intervals. The character and time relation of the pulses involved in this operation are indicated graphically in FIGS. 1A, 1B and 1C wherein the abscissae are time in seconds and the ordinates are in volts.

Thus, the transducer, the two groups or halves operating in parallel, propagates three-millisecond signal pulses once per second and at approximately 25 milliseconds after each signal pulse and until approximately 25 milliseconds before the propagation of the next succeeding pulse, the two groups or halves of the transducer operate as independent receivers of submarine signals and, hence, during this time will translate signals received thereby. For the particular time constants given above, therefore, the system has an effective maximum echo range of approximately 800 yards.

The signals received by the crystal groups comprise reverberation of amplitude decreasing with time, and echoes of the signal pulses propagated, emanating at the target or other region. The outputs of the two crystal groups are applied to respective, substantially identical, signal channels, the output of one group being shifted 90 degrees in phase by a suitable network 21 for reasons which will appear presently. In FIG. 1 of the drawing, corresponding components of the two channels are identified by the same numeral plus the letter A or B of the respective crystal group.

Specifically, each channel comprises an amplifier 22 followed sequentially by a band-pass filter 23, a threshold device 24 and a limiter 25. The filter is designed to pass a band such that the echo pulses, for example of three-millisecond duration, and of frequency shifted due to the Doppler effect of the target may be transmitted without loss. The Doppler effect due to motion of the torpedo is in the same direction at all times and is allowed for by adjustment of the mid-band frequency of the filter. In a specific system wherein the time constants were as noted heretofore, and the operating supersonic frequency was 27.4 kilocycles, filters having a mid-frequency of 28 kilocycles and a band width of $\pm 650$ cycles have been found satisfactory. The transmission characteristic of each filter is illustrated in FIG. 1D. Each amplifier 22 is provided with automatic gain control 26, a typical construction of which will be described in detail hereinafter, which varies the amplifier gain so that at the output of each amplifier the reverberation appears of substantially constant amplitude but the echoes appear as peaks. The character of the input to each channel is illustrated in FIG. 1E wherein R is the reverberation and P are the echo peaks, the gain variation characteristic of the amplifier 22 is illustrated in FIG. 1F and the character of the signal beyond each filter and as applied to the respective threshold device 24 is illustrated in FIG. 1G.

The threshold devices 24 have a transmission characteristic as indicated in FIG. 1H and serve to remove or suppress all signal components of less than a preassigned amplitude supplied thereto. This amplitude is set above the level of the reverberation so that, as indicated in FIG. 1J, only the echo peaks are passed to the respective limiter 25.

The transmission characteristic of the limiter 25 is as illustrated in FIG. 1K so that for all echo signals of amplitude above a preassigned minimum value, the outputs of the limiters are of equal and constant amplitudes. The form of these outputs is as shown in FIG. 1L. However, these outputs are of relative phase determined by the horizontal angle between the torpedo and the target or region at which the echoes originate. Thus, the outputs of the two channels as they appear immediately beyond the limiters 25 are a function of the phase of the echo signals received by the two crystal groups 10A and 10B but are independent of the absolute intensity of such signals.

The outputs of the two limiters 25 are applied to a phase sensitive detector or bearing deviation indicator 27 which converts them into a direct current potential proportional in amplitude to the phase difference at the two crystal groups 10A and 10B of the echo signals and of polarity determined by the direction, to the left or to the right, of the target with respect to the longitudinal axis of the torpedo. Thus, the phase sensitive detector provides a direct current signal of amplitude proportional to and polarity determined by the magnitude and sign respectively of the horizontal angle between the target and the torpedo. The transmission characteristic of the detector 27 is as illustrated in FIG. 1M and a typical form of output thereof is shown in FIG. 1N.

The directional translator comprises, as illustrated in FIG. 2, a condenser 28 and a unidirectionally conductive device 29 connected to the output of the detector 27, the device 29 being controlled in accordance with the output of one of the receiver channels in such manner that the device 29 is rendered conductive when a signal of amplitude above the threshold set by the threshold devices 24 is transmitted by the one channel. The condenser 28 is arranged to discharge through the device 29 and to be charged to a voltage of predetermined magnitude and polarity from a suitable source, not shown, over the contact 31 of a charging relay 32. The relay 32 is controlled from the timer 13 so that the condenser is charged to the voltage noted at the beginning of each pulsing cycle. The discharge circuit for the condenser 28 through the device 29 is constructed and arranged to have a time constant of a fraction of a millisecond.

A second condenser 33 of small capacity relative to that of the condenser 28 is adapted to be connected to the condenser 28 over the contact 34 of a transfer relay 35 and the contact 36 of the charging relay 32 and is adapted also to be short-circuited over the contact 37 of a shorting relay 38 and contact 39 of the transfer relay 35. The transfer and shorting relays 35 and 38 respectively are controlled by operation of a trigger 30 energized in accordance with the output of one of the limiters 25, and timer 13 over a transfer enabler 39, the control circuit for the transfer relay including a delay element 40. Details of the control circuit will be set forth hereafter; for present purposes, it is noted that the transfer enabler is conditioned to operate at the end of each pulse propagating period and operates in response to operation of the trigger 30 when a signal above the threshold set by the devices 24 is passed by the receiver channels. When the enabler 39 operates, the relay 38 operates to momentarily short-circuit the condenser 33. At a fixed time, for example 75 milliseconds in a specific system having the time constants given heretofore, set by the delay element 40, after operation of the transfer enabler 39 in response to an echo signal, the relay 35 operates and the condenser 33 is connected to the condenser 28 over the contact 34 of the relay 35 and the contact 36 of the relay 32.

Sequentially, the general operation of the system as thus far described is as follows: During the pulse transmitting period, that is when the transducer 10 is energized by the oscillator 11 to propagate a supersonic signal pulse, the condenser 28 is charged to the prescribed value. The transducer is then coupled to the receiver system. When an echo of at least a preassigned minimum intensity is received by the transducer, the trigger element 30 operates to effect opening of the charging circuit for the condenser 28 and the device 29 is rendered conductive. Also a voltage of the character described heretofore is produced at the output of the phase sensitive detector 27. The condenser 28 discharges through the device 29 until the voltage appearing across the condenser 28 is equal in magnitude and opposite in polarity to that produced at the output of the detector 27. At the end of the interval determined by the delay element 40, the relay 35 operates and the charge on condenser 28 is transferred to the smaller condenser 33, which had been discharged previously by operation of the shorting relay 38. Thus, there appears across the condenser 33 a voltage of amplitude proportional to and polarity determined by the bearing of the source of the echo relative to the target. The condensers 25 and 33 hold their charges so that the relatively short echo voltage pulses are converted into a voltage of relatively long duration across the condenser 33. This voltage is utilized to control an electromechanical system, described hereinafter, to effect deflection of the rudder to steer the torpedo to port or starboard as required to guide the torpedo toward the target. The condenser 33 remains connected to the condenser 28 until the initiation of the next succeeding pulse projecting period.

An important feature of the directional translator is that it enables automatic selection between echoes originating at the target ship and those from the wake of this ship, whereby false steering of the torpedo, that is toward the wake instead of toward the ship, is prevented. Broadly stated, this is accomplished by presetting the electromechanical system and the relation of the polarity of the direct current potential obtained from the detector 27 with respect to the direction of incidence of the echoes upon the transducer so that the translator will respond only to echoes received by the transducer from the source furthest to the right or furthest to the left of the torpedo. If the torpedo is launched toward a target traveling in such direction that the torpedo will approach the target from the starboard side of the target, the steering system is preset, at launching, so that the directional translator responds only to the more right of the two echoes, i.e., to the ship echo and not the wake echo; conversely, if the torpedo is launched so that it will approach the target from the port side, the system is preset so that the translator will respond only to the more left of the two echoes, i.e., to the ship echo and not the wake echo.

The operation and principles involved will be understood from the following considerations with particular reference to a specific illustrative case. Assume that the maximum direct current voltage obtainable at the output of the detector 27 is 10 volts, positive or negative, depending upon whether the echo is received from the right or left respectively of the torpedo, and that the device 29 is poled so that it will conduct only in the direction indicated by the arrow C in FIG. 2. The charging circuit for the condenser then is made such that this condenser is charged initially to 10 volts and in such direction that when the device 29 is rendered conductive the condenser can discharge therethrough. That is, the condenser is charged 10 volts positive as indicated in FIG. 2.

As noted heretofore, when an echo of at least a prescribed minimum intensity is received by the transducer, the condenser 28 discharges until the voltage appearing thereacross is equal in magnitude and opposite in polarity to the voltage appearing at the output of the detector 27. Thus, for the case under discussion, for an echo signal the voltage appearing across the condenser 28 after discharge thereof will be between 10 volts positive and 10 volts negative.

It will be appreciated that because the device 29 is unidirectionally conductive and further because the voltage to which the condenser 28 is charged initially is equal in magnitude to the maximum voltage obtainable from the detector 27, the charge on the condenser 28 can be modified only in the negative direction. Thus, if after the condenser has discharged in response to receipt by the system of one echo and a second echo is received at the transducer from such direction as to make the output voltage of the detector more positive, the voltage appearing across the condenser will be further modified, i.e., it will become more negative. However, if the direction of the second echo is such as to make the output voltage of the detector less positive, no change in the voltage appearing across the condenser 28 will result because of the unidirectional character of the device 29. Consequently, the translator selects from the two echoes the one which results in the greater positive output voltage for the detector 27 and the condenser 33 is charged in accordance with this voltage. Therefore, depending upon the presetting of the system, the translator selects the echo signal emanating from either furthest to port or starboard of the torpedo and the latter is steered toward the target ship and not toward the wake of this ship.

As noted heretofore, upon the initiation of the next succeeding pulse period, the condenser 33 is disconnected from the condenser 28. When an echo of the succeeding pulse is received, the sequence of operations outlined above is repeated. That is, the condenser 33 is short-circuited momentarily and is then charged to the voltage appearing across the condenser 28 and corresponding to the furthest left or right echo as the case may be, i.e., to the echo of this succeeding pulse emanating from the target ship.

It will be appreciated that because of the left and right preference feature of the directional translator pointed out above, the torpedo may be caused to attack a desired one of two or more ships within the effective ranging field of the transducer 10.

The electromechanical system for steering the torpedo in accordance with information as to the bearing of the target relative to the torpedo is illustrated in FIG. 2 and comprises a rudder 42 deflectable by a motor 43 to steer the torpedo to port or starboard. The direction of deflection of the rudder is determined by a gyroscope 44 and associated cover assembly 45 of generally conventional construction. The operation of such gyroscope and cover is well known in the torpedo art and, therefore, need not be described in detail here. However, it may be noted that the axis of the gyroscope always is fixed in space and is parallel to the longitudinal axis of the torpedo when the torpedo is launched. The cover is rotatable clockwise or counter-clockwise upon operation of one or the other of a pair of clutches 46. The direction and extent of rotation of the cover determines the direction of the initial rudder deflection; the torpedo is turned proportionately to the extent of cover rotation. The two clutches are adapted to be operated by respective amplifiers 47 which are energized in turn by a phase inverter circuit 48 of such construction that when a signal of one polarity is applied to this circuit, one clutch amplifier 47 and, hence, the associated clutch 46 is operated whereas when a signal of the opposite polarity is applied to this circuit, the other amplifier 47 and, hence, the associated clutch 46 is operated. Thus, as is apparent, the direction of initial deflection of the rudder 42 and, hence, direction of torpedo turn is dependent upon the polarity of the voltage appearing across the condenser 33 and, therefore, upon the bearing of the target relative to the torpedo when an echo from the target is received at the transducer 10.

Associated with the cover 45 and adapted to be actuated thereby or concurrently therewith is a follow-up potentiometer 49 which produces a voltage proportional in amplitude to the cover rotation and of polarity dependent upon the direction of the cover rotation. This voltage is applied to the input of the phase inverter circuit 48 in opposition to the voltage appearing across the condenser 33. The relative amplitudes of the two voltages are made such that when the cover position is corrected to bring the torpedo upon the course called for by the echo signal voltage appearing across the condenser 33, the potentiometer voltage balances the echo signal voltage so that no further change of the cover position occurs.

The follow-up potentiometer 49 is adapted to be coupled to the gyroscope cover 45 by a clutch 50 which is controlled by the transfer relay 35 and shorting relay 38 in such manner that the clutch 50 is released when the relay 38 operates to short-circuit the condenser 33 and operates when the relay 35 operates. The potentiometer 49 is provided with an automatically operable return so that when the clutch 50 is released upon operation of the shorting relay 38, the potentiometer contact arm is centered and the potentiometer is set for zero voltage across the condenser 33.

Associated with the follow-up potentiometer 49 is a limit switch 51 which serves to disable either clutch amplifier 47 when the potentiometer arm reaches a preset point to one side or the other of the central position. Specifically, the switch 51 functions to disable the clutch operating at any time when the potentiometer arm reaches a position such that the potentiometer voltage is of the value corresponding to the maximum correction of the torpedo course that can be obtained during a pulsing cycle. This maximum will be determined by the minimum turning radius of the torpedo and the length of the pulsing cycle. For example, if, as in the specific case noted heretofore, signal pulses are propagated once a second and the torpedo minimum turning radius is such that the torpedo can turn 6 degrees in one second, the switch 51 is set so that the clutches will be disabled when the potentiometer arm reaches the position corresponding to 6 degrees of correction. Thus, the correction is limited to a value that the torpedo can follow between successive pulses.

The general operation of the electromechanical system is as follows: When an echo signal voltage appears across the condenser 33 one or the other of the clutches 46, depending upon the polarity of the voltage noted, is operated and the gyroscope cover 45 is rotated in one direction or the other, i.e., clockwise or counter-clockwise, until the follow-up voltage balances the echo signal voltage whereupon the clutch which was operated releases. As a result of rotation of the cover 45, the rudder 42 is deflected initially in the direction requisite to turn the torpedo toward the target and the torpedo is turned to the extent to provide the correction called for by the echo signal. If the echo signal voltage is such as to call for a course correction greater than that which can be realized in one pulsing cycle, the limit switch 51 operates to disable the clutch which had been operated, to limit the degrees rotation of the gyro cover and, hence, the amplitude of the torpedo turn, so that the course correction is limited to the maximum which can be realized per pulsing cycle. When an echo of sufficient intensity is received during the next pulsing cycle, the condenser 33 is discharged by operation of the relay 38 and the potentiometer is centered atuomatically as noted heretofore. Then the condenser 33 is charged from the condenser 28 and the clutch 50 is operated, both by operation of the relay 35. The sequence of operations outlined above is repeated so that the cover 45 is rotated to provide the correction called for by the new voltage appearing across the condenser 33.

Details of components of an illustrative system and the cooperative relation thereof are shown in FIGS. 5 to 12 inclusive. In order to simplify the drawing and to facilitate description and comprehension of the functioning of the system, the sources for supplying the requisite potentials throughout the system have been omitted for the most part and the polarities alone or the polarities and potential values at certain points, employed in a typical system, are indicated.

The timer 13, is one construction, comprises a pair of unsymmetrical multivibrators one of which determines the oscillator pulse length and recurrence rate, and the other of which determines the length of the period for which the transducer 10 is associated operatively with the oscillator 11. The two multivibrators are controlled or associated, for example, in the manner disclosed in the application, Serial No. 637,410, filed December 27, 1945, and now abandoned of Donald D. Robertson, so that the oscillator is enabled a fixed time after the initiation of each period in which the transducer is coupled to the oscillator. For example, if this period is of 50 milliseconds duration, the oscillator may be enabled approximately 25 milliseconds after the beginning of each period.

Figure 5:
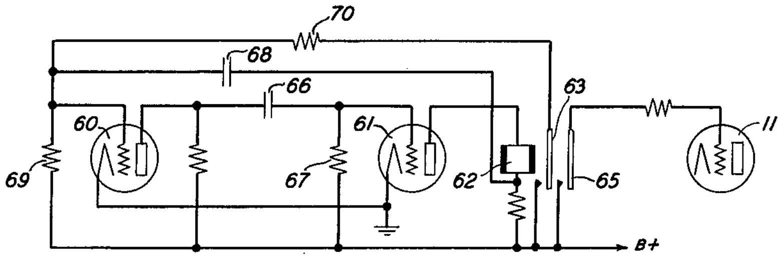
FIG. 5 is a circuit diagram showing details of the timer included in the system illustrated in FIG. 1.

The oscillator, as noted heretofore, may be an electronic oscillation generator of the class C type which is biased so that normally it is disabled. It is controlled, as illustrated in FIG. 5, by a multivibrator comprising a pair of electron discharge devices 60 and 61, the anode circuit of the device 61 including a relay 62 having armatures 63 and 65 and associated contacts. The control grid of each device is coupled to the anode of the other by a resistance capacity combination, one coupling including the condenser 66 and the resistance 67 and the other including the condenser 68 and resistance 69 and, when the relay 62 operates, the resistance 70. The parameters of the first combination, i.e. that defined by the condenser 66 and resistance 67, are correlated in ways well known in the art, to determine the recurrence rate of the pulses produced by the multivibrator; the pulse length is determined primarily by the second coupling noted and is substantially independent of the relay operate time as will be understood from the following considerations.

In a conventional multivibrator of the configuration illustrated in FIG. 5 but not including the relay 62 or resistance 70, the duration of the period in which the device 61 is conductive would be fixed by the time constant of the resistance condenser combination 69, 68. That is, as illustrated in FIG. 6, if $T_2$ is the time at which the device 61 is rendered conducting, the voltage upon the control grid of the device 60 would vary as indicated by curve A, at a rate determined by the constants of condenser 68 and resistance 69, and the device 61 would remain conducting until a time $T_3$ at which this voltage reached the cut-off value for the device 60.

Figure 6:
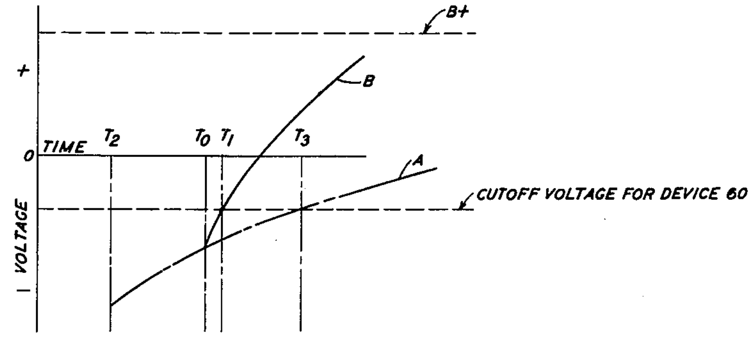
FIG. 6 is a graph illustrating operating characteristics of the timer shown in FIG. 5.

However, in a multivibrator of the construction illustrated in FIG. 5, when the relay 62 operates, at a time $T_0$ indicated in FIG. 6, the time $T_0-T_2$ being the operate time of the relay, the resistance 70 is connected in parallel with the resistance 69. Consequently, the voltage upon the grid of device 60 varies as indicated by the curve B and the device 61 is rendered non-conducting at time $T_1$. The time $T_1-T_0$ can be fixed accurately, of course, by proper correlation of the constants of the condenser 68 and of the resistances 69 and 70. The release time of the relay is made small in comparison to the time $T_1-T_0$. The circuit configuration is conducive to realization of small relay release time inasmuch as the relay inductance is insufficient to prolong conduction in device 61 after device 60 becomes conductive. Thus, the period during which the armature 65 is in engagement with its contact, whereby a keying voltage is applied to the oscillator device 11 to render it operable, is $T_1-T_0$ plus the release time of the relay 62.

Advantageously, in any particular multivibrator of the construction illustrated in FIG. 5, certain relations of the times should be observed. Specifically, the time constant for the curve A should be made such, by correlation of the condenser 68 and resistance 69, that the time $T_3-T_2$ is long compared to $T_1—T_0$. The relay release time should be small as noted heretofore. In a typical system for producing 3-millisecond pulses, i.e. for enabling the oscillator 11 for 3-milliseconds, a relay having an operate time of 10 milliseconds and a release time of 1 millisecond and correlation of the circuit constants so that $T_1—T_0$ equals 2 milliseconds have been found satisfactory.

Figure 7:
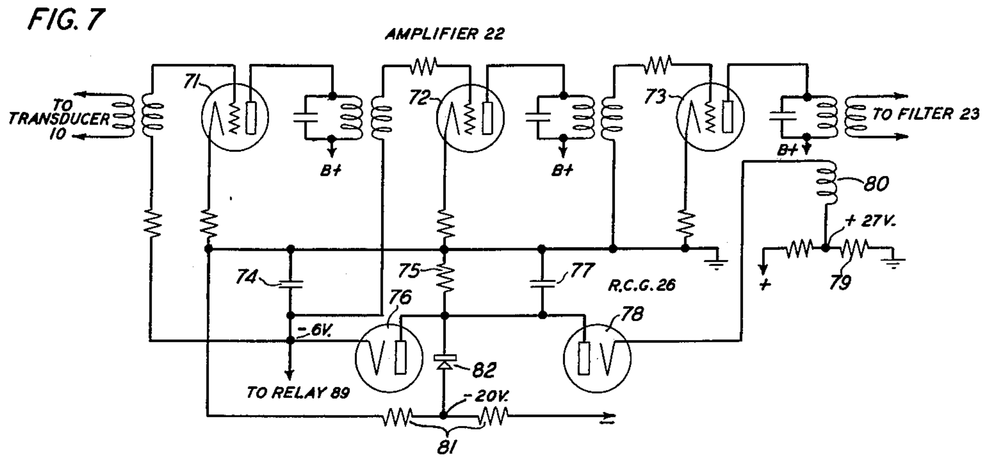
FIG. 7 is a circuit diagram showing details of the amplifier and gain control included in the receiver part of the circuit illustrated in FIG. 1.

Each amplifier 22, in one construction illustrated in FIG. 7, comprises three transformer coupled stages 71, 72 and 73 the outputs of which are tuned, fairly broadly, to the frequency of the oscillator to allow for Doppler effect and variations in the oscillator frequency. The last stage 73 may be of fixed gain; the first two stages 71 and 72 are provided with reverberation controlled gain so that at the output of the amplifier such reverberation as may be received by the associated transducer half 10A or 10B appears with substantially constant level.

The gain control is effected by a condenser 74 which determines the bias upon the control grids of the devices 71 and 72 and is connected, as shown, to discharge through a resistance 75 and diode rectifier 76 in series. The resistance 75 is bridged by a second condenser 77, of small capacity relative to that of the condenser 74, and is in series with a second diode rectifier 78 the cathode of which is biased positive by way of a potential divider 79 through a connection including a winding 80 of the output transformer for the amplifier stage 73. As indicated in the drawing, FIG. 7, one terminal of the condenser 74 is connected to a source by way of the timer 13, the connection being such that, for example as disclosed hereinafter or in the application of Donald D. Robertson identified heretofore, during the periods for which the transducer 10 is operatively associated with the oscillator 11, the condenser receives a negative charge sufficient to render the devices 71 and 72 non-conducting.

Connected between the anodes of the rectifiers 76 and 78 and a potential divider 81 is a rectifier 82, for example, of the copper-copper oxide type, the function of which will appear presently.

As noted above, the condenser 74 is charged negatively during a period, for example of 50 milliseconds duration, to a potential sufficient to place a bias just sufficient to render the devices 71 and 72 non-conducting upon the control grids of these devices. In a specific and illustrative system, the condenser is charged 6 volts negative as indicated in FIG. 7. In general, the period noted is made of such length that at the end thereof the reverberation level of the transducer 10, considering both volume and surface reverberation, is approximately the maximum that is likely to be encountered during use of the system. The positive bias upon the cathode of the rectifier 78 is made large in comparison to the maximum voltage appearing upon condenser 74 and a preassigned ratio below the level which the threshold devices 24 will pass; for example, it may be made 27 volts in the specific and illustrative case noted. The bias applied to the rectifier 82 is made small, for example 20 volts negative in this case.

At the end of the period aforementioned, for example of 50 milliseconds duration, the tranducer 10 is coupled to the receiver circuit and the charging circuit for the condenser 74 is opened. Thereupon, the condenser 74 begins to discharge through the resistance 75 and rectifier 76 at a rate, made such by correlation of the constants of the discharge circuit, that the gain of devices 71 and 72 increases at a rate equal to or considerably greater than the rate at which the reverberation intensity at the transducer decreases. As the condenser discharges, the devices 71 and 72 are rendered conductive and the gain thereof increases in accordance with the decrease in the bias upon the control grids of these devices. Consequently, the reverberation level at the output of the amplifier is maintained substantially constant. If signal pulses, such as are due to echoes of the pulses propagated by the transducer, are received and are of amplitude, at the output of the amplifier, above the bias upon the cathode of the rectifier 78 plus the voltage appearing at that time across the condenser 77 due to discharge of the condenser 74, the rectifier 78 becomes conducting. Consequently, the rectifier 76 is blocked and discharge of the condenser 74 ceases so that, for the duration of the echo pulse, the amplifier gain remains substantially constant.

Upon cessation of the echo pulse, the condenser 77 discharges through the resistance 75 and the condenser 74 again begins to discharge. The time constant of the discharge circuit for the condenser 77 is made small, for example one-tenth that for the discharge circuit for the condenser 74. In a specific system, wherein the times are as set forth heretofore, time constants for the condensers 74 and 77 of substantially 130 and 13 milliseconds respectively have been found satisfactory. Hence, substantially no delay in resumption of discharge of the condenser 74 upon cessation of an echo pulse occurs and the amplifier gain is increased to maintain the reverberation level at the amplifier output substantially constant. Of course, if during the period that the receiver is associated with the transducer additional echo signals are received the sequence of operations set forth is repeated for each such signal. Consequently, at the output of the amplifier echo signals appear as peaks or pulses and the reverberation appears as a voltage of substantially constant amplitude.

By virtue of the rectifier 82 the time during which the voltage upon condenser 77 can prevent discharge of the condenser 74 is limited. Specifically, when the voltage upon condenser 77 due to a peak signal exceeds 20 volts in the particular case given, this condenser discharges through the circuit including the rectifier 82. The resistance of rectifier 82 and resistors 81 is made small in comparison to resistor 75, so that for the condition noted, the condenser 77 discharges quickly to 20 volts. Thus, large echo pulses cannot unduly delay resumption of discharge of the condenser 74. Hence, a weak echo signal following a strong echo signal will be detected and appear of proper amplitude in the output of the amplifier.

As noted heretofore, the output of each amplifier is translated in succession by the respective band filter 23, threshold device 24 and limiter 25, and at the outputs of the two limiters corresponding echo signals appear as voltages differing essentially only in phase, the phase difference, of course, being determined by the bearing, relative to the torpedo, of the object from which the echoes emanate, and the 90-degree phase difference introduced by the phase shift 21.

The output voltages of the two limiters 25 are combined in sum and difference relation and resolved into a direct current voltage by the detector 27. The detector, in one illustrative form shown in FIG. 8, comprises a bridge two adjacent arms of which are substantially identical, each of these arms including a respective half of the output winding 83 of the limiter 25A and a rectifier 84, for example, of the copper-copper oxide disc type, the two rectifiers 84 being poled similarly as shown. The other two arms of the bridge also are substantially identical, each including a condenser 85 in parallel with a resistor 86. The output voltage of the limiter 25B is applied directly between one pair of conjugate points of the bridge. As is apparent, the voltage between the other pair of conjugate points $x$, $x$ is a direct current resultant of the sum and difference of the outputs of the two limiters. This voltage will be of amplitude proportional to the phase difference between the inputs to the two transducer halves 10A and 10B and of polarity determined by the relative phase of these inputs. Hence, the direct current voltage appearing across the terminals $x$, $x$ is a measure of the magnitude, and related to the sign of the bearing, relative to the torpedo, of the object from which the echo signals translated by the receiver system emanate.

As pointed out heretofore, the direct current voltage at the output of the detector 27 is applied to the condenser 28, previously charged to a prescribed voltage, and the resultant potential is transferred to the condenser 33 which is included in the control system for the rudder motor. The condenser charging and discharging circuits involve the relays 32, 35 and 38 shown in detail in FIG. 8. Each of these relays comprises two sets of armatures and associated contacts, the two sets being designated "Top" and "Bottom" in FIG. 8 and the individual armatures and contacts being identified by a respective number between 1 and 6, inclusive. To simplify and facilitate subsequent description herein, both the armatures and contacts will be referred to herinafter as contacts. Also, to facilitate comprehension of the operation of the relays as set forth in detail presently, certain characteristics of the relays and relations involving the relays may be noted at this point.

Figure 8:
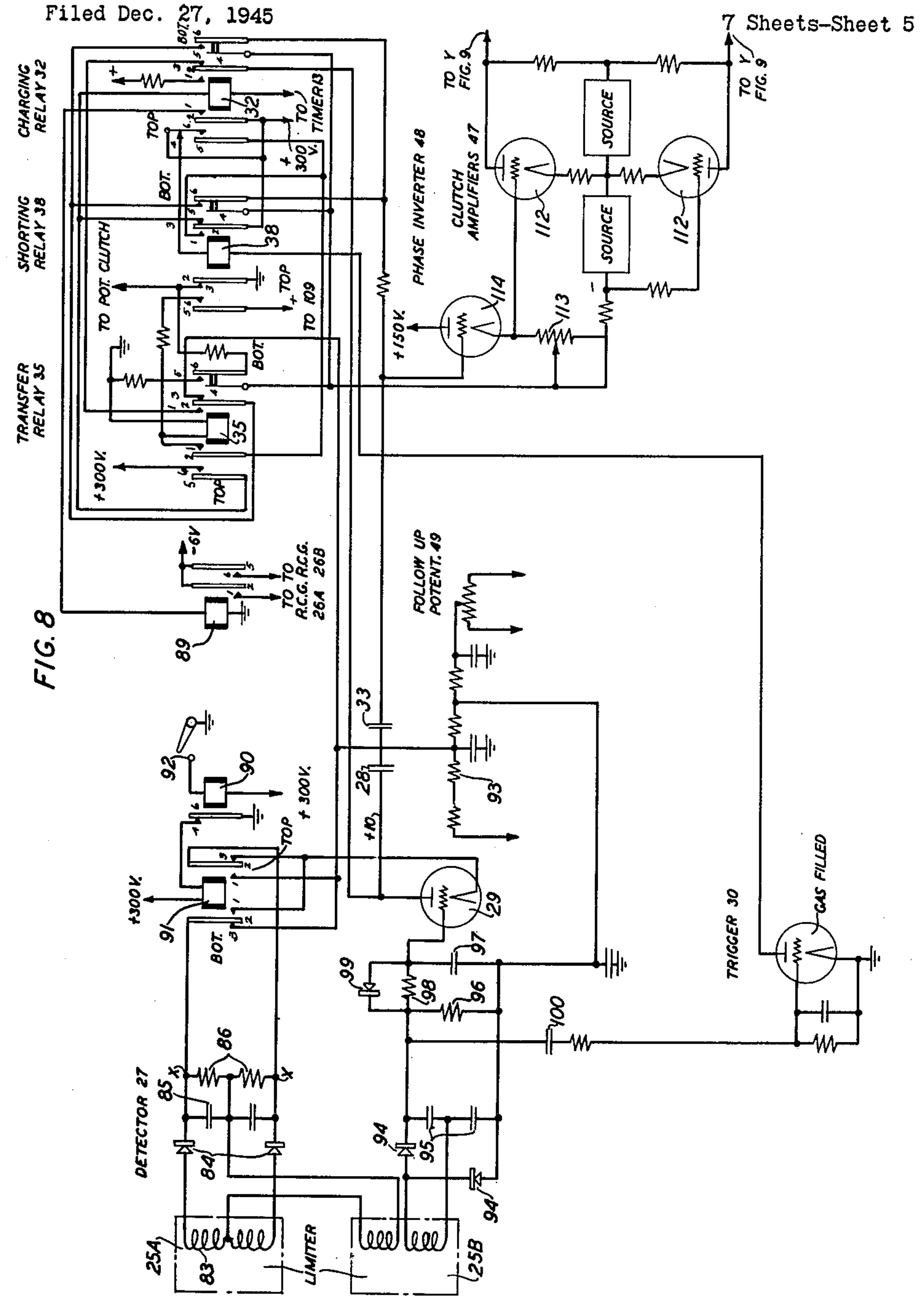
FIG. 8 is another circuit diagram showing details of the system illustrated in FIGS. 1 and 2, particularly of the detector, trigger and relay circuits included therein.

The charging relay 32 is constructed so that whenever the relay is energized the bottom conatcts 5 and 6 thereof will break before bottom contacts 2 and 3 thereof make. The energizing circuit for the relay 32 is controlled from the timer 13 over either bottom contacts 2 and 3 of the relay 38 or top contacts 5 and 6 of relay 35. The shorting relay 38 is controlled by the trigger 30 over top contacts 4 and 6 of the charging relay 32, the trigger 30 being a gaseous discharge device, as shown in FIG. 8, which until a potential of at least a preassigned amplitude, as described hereinafter, is impressed upon the grid or control electrode thereof is non-conducting. The transfer relay 35 is controlled by a potentiometer center indicator, described hereinafter, over top contacts 5 and 6 of relay 38. Other energizing circuits for the relay 35 are traced over top contacts 1 and 2 thereof and either bottom contacts 1 and 2 of relay 38 or top contacts 5 and 6 of relay 32.

The relay 32 controls also, over its top contacts 1 and 2, the energizing circuit for a relay 89 which, when operated, closes the charging circuits for the condensers 74 over its contacts 1, 2, 5 and 6.

Figures 9, 10:
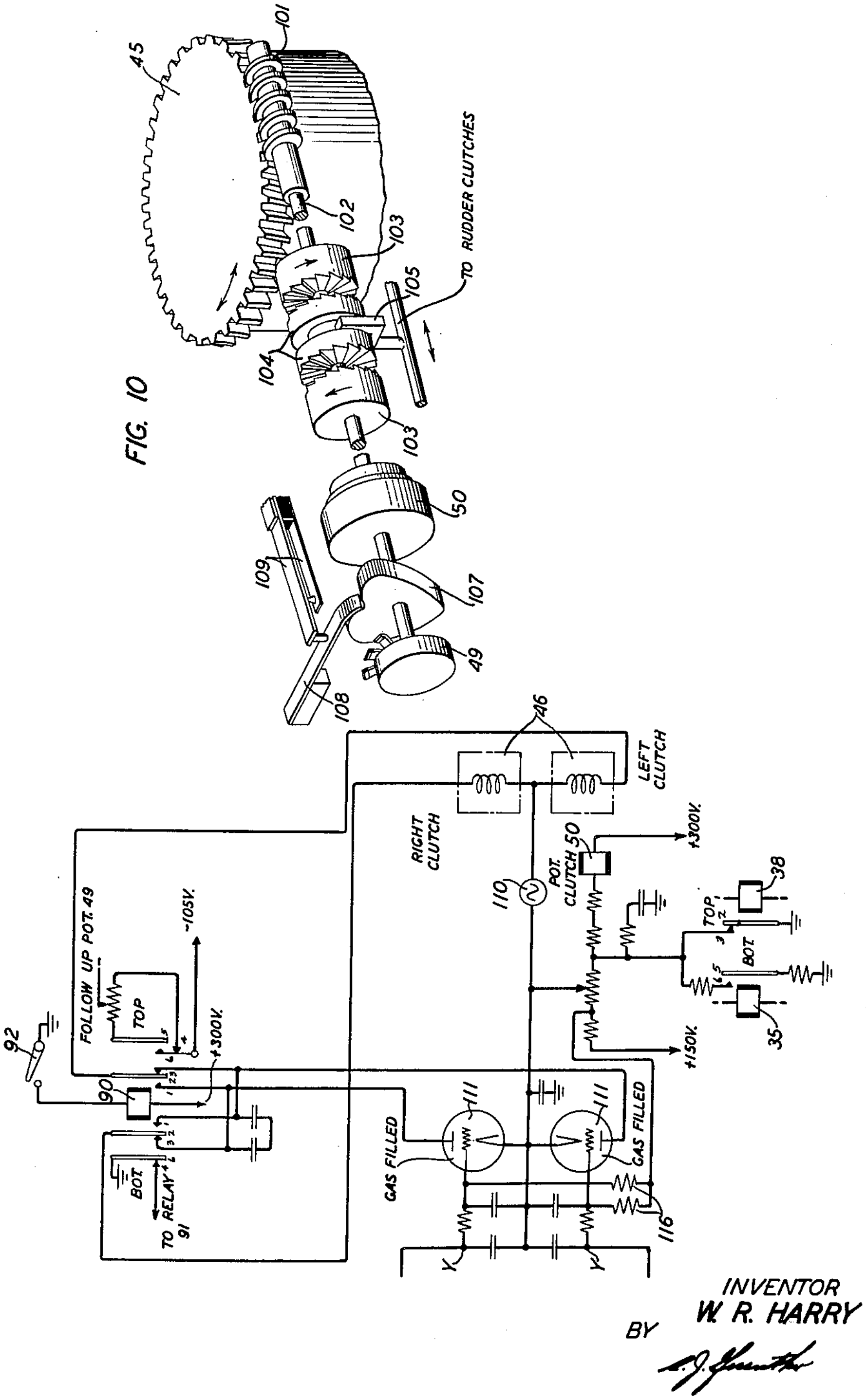
FIG. 9 is still another circuit diagram showing details of the portions of the steering system illustrated in FIG. 2.
FIG. 10 is a perspective view of portions of the rudder motor control mechanism.

Two other relays 90 and 91 are involved in the operation of the condenser 28, the relay 90 controlling the condition of the relay 91, as is manifest from FIG. 8, in accordance with whether or not the preset switch 92 is open or closed. In order to avoid undue complication of the drawing, only two of the contacts, bottom 4 and 6, of the relay 90 have been shown in FIG. 8. Other contacts of this relay are shown in FIG. 9 and their function will be described hereinafter.

Figure 11:
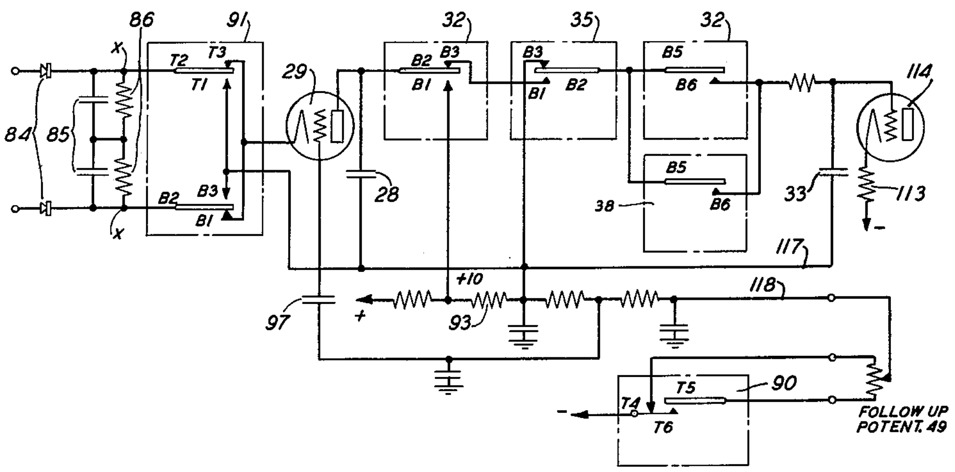
FIGS. 11 and 12 are diagrams of portions of the circuits illustrated in FIG. 8 simplified to show the cooperative association of certain components and relay contacts.
Figure 12:
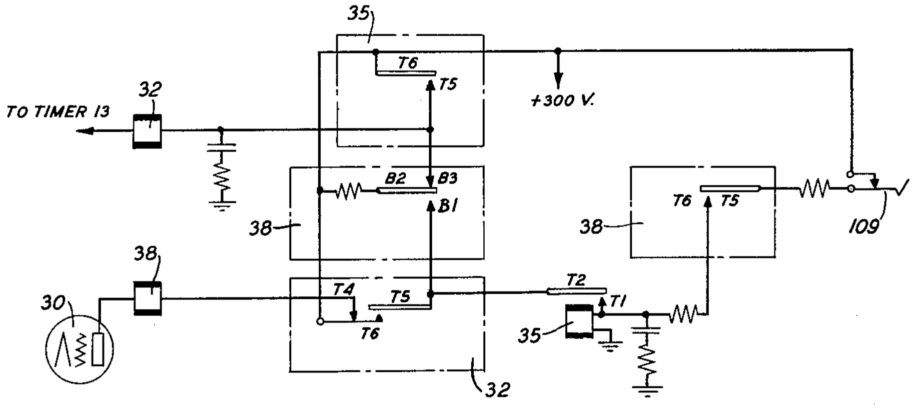

Also associated with the condenser 28, as noted heretofore, is the unidirectionally conductive device 29 which, as shown in FIGS. 8 and 11, may be an electron discharge device having its grid normally biased negative so that this device is blocked by way of a potential divider 93. The blocking bias upon the grid of the device 29 is overcome when an echo signal of intensity sufficient to pass the threshold device 24B is received, whereby the device 29 is rendered conductive to direct current in the direction from its anode to the cathode. Specifically, as illustrated in FIG. 8, a portion of the output of the limiter 25B is rectified by the network including the rectifiers 94, for example of the copper-copper oxide type, and condensers 95, the rectified voltage being applied across the resistor 96 which is bridged by the condenser 97. Also, when such an echo signal is received, the trigger device 30 is fired by the application of a pulse to its grid by way of condenser 100. The parallel resistance 98 and rectifier 99 combination assures that the charging time constant for the condenser 97 is greater than that for the condensers 85 and that the discharging time constant for condenser 97 is less than that for the condensers 85 so that if, because of envelope distortion, the voltage pulse across the terminals $x$, $x$ is rounded at the ends, the device 29 will become conducting after the maximum voltage pulse value has been reached and before this pulse begins to decay, whereby the condenser 28 will receive a charging pulse of the maximum value of the output pulse from the detector 27, over one of two circuits now to be described.

As shown in FIGS. 8 and 11, one terminal of the condenser 28 is connected directly and permanently to the anode of the device 29. The other terminal is connected to the bottom contact 3 and top contact 1 of the relay 91, in common, and the cathode of the device 29 is connected to the top contact 3 and bottom contact 1, in common, of this relay. (In FIGS. 11 and 12, top relay contacts and armatures are designated by the letter T plus the contact or armature numeral; bottom contacts and armatures are designated by the letter B plus the identifying numeral.) As is apparent, then, the condenser 28 will be connected across the terminals $x$, $x$ through the device 29, the relative polarities being determined by the condition of the relay 91 and thus upon whether the preset switch 92 is opened or closed. Specifically, if the switch is open, the relay 91 will be in the condition shown in FIGS. 8 and 11 and the circuit for the condenser 28 may be traced from the lower terminal $x$, over bottom contacts 2 and 3 of relay 91, to the condenser 28, thence to the anode and cathode of the device 29, and from the cathode over top contacts 3 and 2 to the top terminal $x$. However, if the preset switch 92 is closed, the relay 91 is operated and the condenser circuit is now traced from the lower terminal $x$ over bottom contacts 2 and 1 of relay 91 to the cathode of the device 29, thence to the anode, through condenser 28, and to the top terminal $x$ over top contacts 1 and 2 of the relay 91.

Now, the polarity of the potential appearing across the terminals $x$, $x$, as has been pointed out heretofore, is determined by the sign of the bearing of the object from which the echo emanates, relative to the torpedo, i.e. the upper terminal $x$ will be positive or negative, for example, depending upon whether the object is to the left or the right of the torpedo. Also, as has been pointed out heretofore, the magnitude of the potential noted is proportional to the amplitude of the bearing angle. Further, as has been pointed out, during the pulsing period, i.e. 50 millisecond period in the example cited heretofore, the condenser is charged to a voltage equal to the maximum voltage obtainable at the terminals $x$, $x$ of the detector 27, e.g. 10 volts in the specific example heretofore cited. The charging circuit may be traced in FIGS. 8 and 11 from the potential divider 93 over bottom contacts 1 and 2 of relay 32 through the condenser 28 and back to the potential divider.

It is to be noted that inasmuch as the device 29 can conduct in only one direction, the condenser can discharge but cannot charge therethrough. Thus, the maximum voltage that can obtain upon the condenser is that to which it is charged initially, i.e. 10 volts positive in the example cited, and this voltage can decrease from this value to a lower positive value or to a negative value, 10 volts maximum in the example cited, depending upon the polarity of the potential appearing across the terminals $x$, $x$ of the detector 27. Hence, when an echo signal voltage appears across the terminals $x$, $x$, the condenser discharges until the potential thereacross is equal to and opposes the echo signal voltage as it appears across the terminals $x$, $x$.

The unidirectional character of the device 29 enables setting of the system, by the preset switch 92, so that the potential appearing across the condenser 28 is determined by the echo emanating from either furthest to the left or furthest to the right of the torpedo. This will be seen from consideration of the following examples. Assume that, in an illustrative system, the upper terminal $x$ is positive and the lower terminal $x$ is negative for an echo signal emanating from an object to the right of the torpedo and that this object is a ship to the right of the torpedo and traveling from right to left relative to the torpedo. For echoes emanating from an object to the left of the torpedo, the polarities noted, of course, will be reversed. Assume further that the switch 92 is open so that the relay 91 is in the condition illustrated in FIGS. 8 and 11. An echo emanating from the ship will result in placing a positive voltage pulse upon the cathode of the device 29 of amplitude proportional to the bearing of the ship relative to the torpedo. The condenser, thereupon, will discharge through the device 29 until its voltage equals and opposes that across the terminals *x, x*. An echo emanating from the wake of the ship will produce a greater positive voltage upon the cathode of the device 29, inasmuch as, for the conditions postulated, the wake is further to the right of the torpedo than the ship itself. Inasmuch, however, as the device 29 cannot conduct except in the anode to cathode direction, this second echo voltage will not result in any further modification of the condenser voltage. Thus, for the conditions postulated, the system automatically selects from the two echoes, the one emanating from the leftmost of the two objects, i.e. the ship, and the echo from the wake has no effect upon the voltage across the condenser.

Assume, now, that the ship is to the left of the torpedo and is traveling from left to right relative to the torpedo and that the switch 92 is closed. An echo from the ship itself will result in the placing of a positive voltage pulse upon the cathode of the device 29, inasmuch as for this case, i.e. echo emanating from the left of the torpedo, the lower terminal *x* in FIGS. 8 and 11 is positive and, inasmuch as the switch 92 is closed, this terminal is connected to the cathode over bottom contacts 2 and 1 of the relay 91. The condenser 28 will discharge until the voltage thereacross is equal to and opposes the echo pulse. An echo from the ship's wake, being further to the left than the ship, relative to the torpedo, will result in the placing of a greater positive voltage pulse upon the cathode of the device 29. But, inasmuch as the device is unidirectional, this wake echo will not modify the voltage upon the condenser. Thus, for the conditions postulated, the system automatically selects the echo emanating from the rightmost object, i.e. the ship, and the wake echo has no effect upon the condenser voltage.

Hence, by setting the switch 92 at the time the torpedo is launched, when the direction of travel of the target ship relative to the launching direction of the torpedo is known, the steering system is conditioned to respond to echoes emanating from the target ship and to disregard echoes emanating from the wake of the ship. Of course, as will be apparent, the steering system may be preset in like manner so that the voltage appearing across the condenser 28 will be determined by one, either the leftmost or rightmost, of two or more target ships.

The voltage appearing across the condenser 28 after it has been modified in accordance with the target echo signal is utilized to affect deflection of the rudder 42, by rotating the gyroscope cover 45, in the direction and to the extent requisite to turn the torpedo toward the target. The more significant elements of the mechanical and associated elements of the gyroscope cover control are illustrated in FIG. 10. As there shown, the cover 45 includes a gear cooperating with a worm 101 fixed to a shaft 102. Rotatable upon the shaft are free gears 103 which rotate continuously in opposite directions as indicated by the arrows thereon. In order to simplify the drawings, the motive source, which may be of conventional construction, for the gears 103 is not shown. Splined to the shaft are gears 104 shiftable along the shaft 102 by a linkage 105 controlled by the solenoids of rudder clutches 46, the construction being such that when either solenoid operates a respective gear 104 meshes with the adjacent gear 103, whereby the shaft 102 is rotated in one or the opposite direction and the cover plate 45 is turned accordingly. Coupled to the shaft 102 by the potentiometer clutch 50 is the follow-up potentiometer 49 provided with a centering device including the heart-shaped cam 107 and associated spring 108, which returns the potentiometer to neutral position when the clutch 50 releases. Controlled by the spring 108 are the contacts 109 constituting the potentiometer center indicator, the construction being such that the contacts are closed only when the potentiometer is at neutral position.

The clutches 46, as noted heretofore and as illustrated in FIG. 9, are of the solenoid type, the solenoids being energized from an alternating current source 110, under control of trigger-type gaseous discharge devices 111 and the relay 90, each clutch being energized only when a respective device 111 fires. Specifically, when the relay 90 is in the condition shown in FIG. 9, i.e. deenergized, the energizing circuit for the right clutch solenoid may be traced from the alternating current source 110, through the right clutch solenoid, over bottom contacts 2 and 3 of relay 90 to the upper device 111 and then back to the source. Similarly, the circuit for the left clutch solenoid may be traced from the source 110 through the left clutch solenoid, over top contacts 2 and 3 of relay 90 to the lower device 111 and thence back to the source. Thus, for the relay condition postulated, the right clutch 46 is operated when the upper device 111 fires and the left clutch is operated when the lower device 111 fires.

If, however, the switch 92 is closed, so that the relay 90 is energized, the right clutch 46 is placed under control of the lower device 111 over an obvious circuit including bottom contacts 1 and 2 of relay 90 and the left clutch 46 is placed under control of the upper device 111 over an obvious circuit including the top contacts 1 and 2 of relay 90.

Which of the devices 111 is fired is determined by the relative potentials of the terminals *y, y*, a bias being applied to the control electrodes or grids of both devices by way of a potentiometer 115, included in an obvious potential divider circuit, and resistors 116 so that normally both devices 111 are nonconducting. Of course, which clutch solenoid will be energized when one of the devices 111 fires will be determined by the condition of the relay 90.

This relay, as has been pointed out heretofore, determines also whether the echo resolving circuit will select the leftmost or rightmost echo. Further, as is clear from FIG. 9, this relay determines the polarity of the voltage or voltage change obtained from the follow-up potentiometer. Whether or not the potentiometer is coupled to the shaft 102 is determined by the condition of the relays 35 and 38, the potentiometer clutch being adapted to be energized over either top contacts 2 and 3 of relay 38 or bottom contacts 5 and 6 of relay 35.

The potential across the terminals *y, y* is determined by the output of a direct current amplifier which, as illustrated in FIG. 8, comprises a pair of similar electron discharge devices 112 connected in push-pull relation. The input circuit for the amplifier includes a balancing potentiometer 113 included in the cathode circuit of an electron discharge device 114. The control grid circuit for the device 114 includes, as is seen best in FIG. 11, the condenser 33 and the follow-up potentiometer 49. Specifically, this circuit may be traced from the cathode of the device 11, through the device to the grid, thence through the condenser 33 and over conductors 117 and 118 to the follow-up potentiometer 49 and over top contacts 4 and 6 or top contacts 5 and 6 of relay 90 back to the cathode of the device 114. Thus, the output of the direct current amplifier and, hence, the relative polarities of the terminals *y, y* is determined by the effective potential upon the control grid of the device 114, which, in turn, is dependent upon the relative voltages across the condenser 33 and that introduced by the follow-up potentiometer.

The latter voltage is proportional to the amplitude of rotation of the gyroscope cover plate 45, and the voltage across condenser 33, as will be described presently, is of the same polarity as and proportional to the potential produced across the condenser 28 in response to receipt of echoes. The polarities of the two potentials, i.e. across the condenser 33 and potentiometer 49, are made such as to be in opposing relation whereby the potentiometer voltage tends to balance the voltage across the condenser. Also, the elements of the translator are so constructed and arranged that, depending upon the polarity of the potential across the condenser 33, that clutch 46 which will result in deflection of the rudder in the direction to turn the torpedo toward the object from which the echo emanated, will be energized and as the torpedo so turns the potentiometer voltage will increase, proportionately to the angle of torpedo turn, in the sense to reduce the effective potential upon the grid of the device 114.

Specifically, in a particular system, the elements of the translator are correlated so that for a positive voltage upon the condenser 33, i.e. for a voltage such that the terminal of the condenser 33 connected to the grid of the device 114 is positive, the lower terminal *y* in FIGS. 8 and 9 will be positive and the lower device 111 will fire whereas for a negative voltage upon the condenser 33, the upper terminal *y* will be positive and the upper device 111 will fire. For the setting of the switch 92 such as to render the echo translating system responsive to the leftmost echo, i.e. so that relay 90 is operated, for an echo emanating from an object to the right of the torpedo, a positive voltage is placed upon the condenser 33 and the lower device 111 fires whereby the right rudder clutch 46 is energized. The gyroscope cover 45 consequently is turned to the left, i.e. counter-clockwise, whereby the rudder is deflected to turn the torpedo to the right. Also, the potentiometer 49 is actuated, the clutch 50 being operated as described hereinafter, whereby an increasing potential in opposition to the voltage across the condenser 33 is introduced in the grid circuit of the device 114. When the potentiometer voltage balances the condenser voltage, the anode current for the device 114 decreases, the potential of the lower terminal *y* falls and the lower device 111 ceases conducting. Consequently, the right clutch 46 releases and motion of both the gyroscope cover plate and follow-up potentiometer ceases. As described hereinafter, the condenser 33 is then short-circuited and the clutch 50 releases so that the potentiometer is returned to center by the action of the spring 108 upon the cam 107. Thus, the translating system is conditioned for response to the next echo signal.

If, for the leftmost setting of the switch 92 and relay 90 noted, the target is to the left of the torpedo, the condenser 33 receives a negative voltage, the upper terminal *y* becomes positive and the left clutch 46 is energized. Consequently, the gyroscope cover 45 is turned in the direction to cause deflection of the rudder to steer the torpedo to the left and the follow-up potentiometer is actuated to balance the voltage appearing across the condenser 33.

If the switch 92 and relay 90 are set so that the echo translating system selects the rightmost echo, the connections between the clutches 46 and devices 111 are reversed, as described heretofore, and the relative polarities of the follow-up potentiometer ends also are reversed. The operation of the rudder is similar to that for the case of leftmost setting as described above.

In either case, i.e. either leftmost or rightmost setting, the cover correction is proportional to the target bearing relative to the torpedo and the torpedo, thus, is steered to the target. Of course, correction is applied for each echo signal received at the torpedo in successive receiving periods. That is, if as in the specific case noted, signal pulses are propagated once per second, an echo signal voltage will be produced across the condenser 33 once per second and the torpedo will be turned accordingly.

There remain to be described the manner in which the voltage aforenoted is placed upon the condenser 33 to provide rudder correction, and the relay sequences for several conditions which may obtain after the torpedo is launched. In brief, as has been pointed out heretofore, the voltage mentioned is placed upon the condenser 33 by transferring to this condenser the charge upon the condenser 28, the transfer being effected in each case shortly after an echo of sufficient intensity to be passed by the threshold devices 24 is received at the transducer 10 following the pulsing period, e.g. the 50-millisecond period in the specific example cited heretofore. At the end of this period, the charging relay 32 is released. When such an echo is received, the trigger device 30 is rendered conductive and thereupon the relay 38 operates, its energizing circuit being closed over bottom contacts 4 and 6 of relay 32, the circuit being obvious from FIGS. 8 and 12. When relay 38 operates, the transfer relay 35 operates, the energizing circuit therefor, heretofore traced, being closed over top contacts 5 and 6 of relay 38.

Thus, to recapitulate, relay 32 is released and relays 35 and 38 are operated. Hence, the condenser 33 is connected in parallel with the condenser 28, the circuit being traced, as seen most readily in FIG. 11, from the upper terminal, in FIG. 11, of condenser 28 over bottom contacts 2 and 3 of relay 32, bottom contacts 1 and 2 of relay 35 and bottom contacts 5 and 6 of relay 38 to the upper terminal of condenser 33, through the latter condenser and, thence, back to the lower terminal of condenser 28. As noted previously, the condenser 33 is small in comparison to the condenser 28 and, as will be brought out presently, at the time in question the condenser 33 is fully discharged, so that the voltage across condenser 28 is transferred quickly to the condenser 33.

The sequence of operations involved in the performance of the torpedo will be understood from the following consideration of the illustrative system disclosed, with particular reference to FIGS. 8, 9, 11 and 12, for a case where, as cited heretofore, the transducer is energized to propagate a 3-millisecond pulse within a 50-millisecond pulsing period, the pulsing period recurring at a rate of once per second. When the torpedo is launched, the relays 32, 35, 38 and 89 are in the condition shown in FIG. 8, i.e. all are released, and the rudder is under gyroscope control so that the torpedo proceeds upon a preset course. At a predetermined time after launching of the torpedo, the echo ranging control circuit is enabled, e.g. by connection of the power supply sources. The timer 13 operates the transfer control 12 and the oscillator 11 whereby 3-millisecond pulses are propagated by the transducer 10. Also for each 50-millisecond pulsing period the relay 32 operates whereby the relay 89 is operated and the condenser 74 in the amplifier gain control circuits are charged. Also, upon operation of the relay 32, a charge 10 volts positive, is placed upon the condenser 28 over the circuit, traced heretofore, including bottom contacts 1 and 2 of the relay 32, and the condenser 33 is short-circuited over bottom contacts 5 and 6 of relay 32 and bottom contacts 2 and 3 of relay 35.

If no echo is received, the relays 32 and 89 release at the end of the 50-millisecond pulsing period and the relays 35 and 38 remain released. The potentiometer clutch remains operated over top contacts 2 and 3 of relay 38 and the potentiometer 49 remains centered so that the contacts 109 are closed. The torpedo, therefore, continues to travel along the gyroscope course.

When the first echo is received, following a 50-millisecond pulsing period, the trigger device 30 breaks down and the relay 38 operates, as described heretofore. When this relay 38 operates, the condenser 33 is short-circuited over bottom contacts 5 and 6 of relay 38 and bottom contacts 2 and 3 of relay 35, and also the potentiometer clutch 50 is released by breaking its energizing circuit at top contacts 2 and 3 of relay 38. The voltage across the condenser 28 is varied in accordance with the echo, as described heretofore, until it is of the value proportional in amplitude and related in polarity to the magnitude and sign respectively of the bearing relative to the torpedo of the object from which the echo emanated. Following operation of the relay 38, the relay 35 operates, its energizing circuit being closed over top contacts 5 and 6 of the relay 38 as described heretofore. When the relay 35 operates, the short-circuit across condenser 33 is broken at bottom contacts 2 and 3 of relay 35, the condensers 28 and 33 are connected in parallel whereby the echo signal voltage is transferred to the latter condenser; also, the energizing circuit for the potentiometer clutch 50 is closed over bottom contacts 5 and 6 of relay 35. Because of the charge placed upon the condenser 33, a voltage is established across the terminals *y*, *y* and one or the other of the devices 111, depending upon the polarity of the charge noted, fires whereby one of the clutches 46 is energized, the gyroscope cover plate 45 is rotated and the rudder is deflected.

Concurrently with the rotation of the cover plate 45, the potentiometer 49 is adjusted in the direction tending to balance the voltage across the condenser 33. When a balance of voltages is thus established, the voltage unbalance across the terminals, *y*, *y* disappears and the device 111 which had fired is extinguished, whereupon the associated clutch 46 is released and no further correction of the cover occurs. When the potentiometer 49 is moved off center, the contacts 109 are disengaged from each other and the energizing circuit for the relay 35 is broken at these contacts. However, the relay 35 does not release, for upon its operation an energizing circuit therefor was closed over its top contacts 1 and 2 and bottom contacts 1 and 2 of the relay 38. Hence, the condensers 28 and 33 remain connected in parallel until the next pulsing period.

During the next 50-millisecond pulsing period, the relay 32 operates so that the following occur: (1) the relay 89 operates, whereby the prescribed charge is placed upon the condenser 74 in the gain control circuits 26; (2) the relay 38 releases, inasmuch as the energizing circuit therefor is broken at top contacts 4 and 6 of relay 32; (3) the trigger device 30 is extinguished as the result of opening of its anode circuit at top contacts 4 and 6 of relay 32; (4) the previously closed energizing circuit for relay 35 is opened at bottom contacts 1 and 2 of relay 38 but another energizing circuit for relay 35 is closed over contacts 5 and 6 of relay 32 so that relay 35 remains operated; (5) the condensers 28 and 33 are disconnected from one another by opening of the connection therebetween at bottom contacts 2 and 3 of relay 32 and bottom contacts 5 and 6 of relay 38; and (6) the charging circuit for the condenser 28 is closed over bottom contacts 1 and 2 of relay 32 so that this condenser is charged to the preassigned voltage, e.g. 10 volts positive in the example cited heretofore.

At the end of the 50-millisecond pulsing period, the relays 32 and 89 release. As a result of release of relay 32, the relay 35 releases by virtue of the opening of its energizing circuit at top contacts 5 and 6 of relay 32. The system, thus, is in the same condition as described heretofore prior to receipt of the first echo except that there is a charge upon the condenser 33, the potentiometer is off center to balance the voltage across this condenser and the contacts 109 are open.

If now an echo is received, the trigger device 30 fires so that the relay 38 operates whereby the condenser 33 is short-circuited over the previously traced circuit including bottom contacts 5 and 6 of relay 38 and bottom contacts 2 and 3 of relay 35. Also, upon operation of relay 38, the potentiometer clutch 50 is released due to opening of the energizing circuit therefor at top contacts 2 and 3 of relay 38. Upon release of the clutch 50 and by the action of spring 108 upon cam 107, the potentiometer 49 is returned quickly to center position and the contacts 109 are closed. Upon closure of the contacts 109, the relay 35 operates whereupon the potentiometer clutch 50 is operated, its circuit being closed at bottom contacts 5 and 6 of relay 35, and the echo signal voltage upon condenser 28 is transferred to the condenser 33. The cover is corrected in accordance with this voltage in the manner described heretofore.

The cycle of operations above described is repeated for each echo received following successive pulsing periods whereby the cover position is corrected once per second to steer the torpedo to the target, the correction applied in each case being proportional to the off-target angle of the torpedo course.

The possibility exists that after an echo has been received, no echo will be received during the next succeeding one-second period. Such a situation may arise, for example, when a foreign object, for example a large fish, is in the general vicinity of the target and the torpedo and within the space angle in which signal pulses are propagated by the transducer 10, or due to countermining explosions or spurious underwater noise peaks. For this case, the potentiometer 49 is returned to center position and the rudder is returned to gyroscope control. The sequence of operations will be understood from the following. As noted heretofore, following receipt of an echo and at the end of the next succeeding pulsing period, the relays 32, 35 and 38 are released, the potentiometer clutch is operated, one of the devices 111 has been conducting and the potentiometer has been adjusted to balance the voltage across the condenser 33. If no echo is received in the time between this and the next succeeding pulsing period, these conditions continue. When, however, during said next succeeding pulsing period the relay 32 again operates, the condenser 33 is short-circuited over bottom contacts 5 and 6 of relay 32 and bottom contacts 2 and 3 of relay 35. Thus, inasmuch as the potentiometer 49 is off center, the effective voltage upon the grid of the device 114 is that due to the potentiometer alone and inasmuch as this voltage is of the polarity opposite that formed upon the condenser 33, the polarity of the potential across the terminals *y*, *y* reverses whereupon the other device 111, i.e., the one not conducting as result of receipt of the echo resulting in rotation of the gyroscope cover plate and potentiometer, fires and the potentiometer 49 is adjusted to conform to zero voltage across the condenser 33. That is, the potentiometer 49 is returned to center position. The steering system, thus, is placed in the same condition as it was before any echo was received and the rudder is placed under gyroscope control whereby the torpedo is returned to and proceeds along the initial gyroscope course until an echo is received.

One other possibility may be mentioned, namely that of an echo being received such a short time before the beginning of the next succeeding 50-millisecond pulsing period that although relay 38 is operated, the follow-up potentiometer has not centered and, therefore, relay 35 is not operated. It will be noted that, for this set of conditions, the relay 32 will not operate at the beginning of the 50-millisecond pulsing period noted, for, as is apparent from FIG. 12, if relay 35 is not operated, the energizing circuit for relay 32 is open at top contacts 5 and 6 of relay 35. As soon as the potentiometer 49 is centered, relay 35 operates and relay 32 thereupon operates. As noted heretofore, overlap between the 50-millisecond pulsing and 3-millisecond pulse propagating periods is provided, this being sufficient to allow for delay in centering of the potentiometer 49 in the case of the possibility of a very late echo.

Reference is made of the application Serial No. 162,464, filed May 17, 1950, a division of the present application and now Patent Number 2,735,009.

Although a specific embodiment of the invention has been shown and described, it will be understood that it is but illustrative and that various modifications may be made therein without departing from the scope and spirit of this invention as defined in the appended claims.

What is claimed is:

1. A torpedo comprising a rudder, means for actuating said rudder, means including a control circuit for determining the direction of turn of the torpedo in response to actuation of said rudder by said actuating means in accordance with the potential extent across a portion of the control circuit, means for propagating underwater signal pulses of prescribed frequency, length and recurrence rate, a pair of devices responsive to underwater signals and spatially related so that the relative phase of the outputs thereof for signals received thereby is a function of the bearing, relative to the torpedo, of the source of the received signals, a pair of similar receiver channels for each of which a respective one of said devices constitutes the input element, each of said channels including means for suppressing the reverberation component of signals received thereby and means for eliminating amplitude differences in the echo component of the received signals, means for resolving the outputs of said channels in combination into a resultant signal of amplitude and polarity determined by the relative phase of echo components of the outputs of said devices, and means for impressing upon said portion of said control circuit a potential of amplitude and polarity determined by said voltage.

2. A torpedo in accordance with claim 1 wherein said means for determining the direction of actuation of said rudder comprises a gyroscope and rotatable cover assembly, the direction and amplitude of torpedo turn being determined by the angular relation of said cover to a preassigned position, said direction determining means comprising also means for rotating said cover from said preassigned position in direction and extent determined by the polarity and amplitude respectively of the difference in the potential extent across said control circuit portion from a preassigned value.

3. A torpedo in accordance with claim 1 comprising means for selectively presetting said resolving means so that when echoes are received by said devices from more than one region the amplitude and polarity of said resultant signal are determined by the echo emanating from the region furthest in a preassigned direction relative to the torpedo.

4. A torpedo comprising a rudder, means for actuating said rudder, means including a control circuit for determining the direction and magnitude of torpedo turn in response to operation of said actuating means, in accordance with the polarity and amplitude of the potential extent across a portion of said control circuit, said determining means including also a gyroscope and rotatable cover assembly associated with said actuating means for determining the amplitude and direction of torpedo turn in accordance with the angular relation of said cover to a preassigned position and means for rotating said cover in accordance with the polarity and amplitude of said potential, underwater signal responsive means for producing a first control potential of amplitude and polarity determined by the magnitude and sign respectively of the bearing, relative to the torpedo, of the source of signals received by said signal responsive means, means for varying the potential across said circuit portion in accordance with said control potential, means for producing a second control potential of amplitude and polarity determined by the extent and direction respectively of cover rotation, including a potentiometer and means for coupling said potentiometer to said cover for adjusting said potentiometer in accordance with rotation of said cover, and means for applying said second control signal to said control circuit in the sense to oppose said first control signal.

5. An underwater echo ranging system comprising means for propagating underwater signal pulses of preassigned frequency, length and recurrence rate, a pair of underwater signal receiving devices spatially related so that for signals of said frequency received thereby the relative phase of the outputs of said devices is determined by the bearing of the source of said signals relative to said devices, a pair of receiver channels for each of which a respective one of said devices constitutes the input element, each of said channels including an amplifier, means for varying the gain of said amplifier for a period following propagation of each of said pulses to maintain the level of the reverberation component of the amplifier output substantially constant, threshold means energized in accordance with the amplifier output for suppressing components thereof of amplitude of said level and below said level and limiter means energized in accordance with the output of said threshold means for substantially eliminating amplitude differences in signals passed by said threshold means, and means for resolving the signals at the ouput of the limiter means in the two channels in combination into a resultant signal of amplitude and polarity determined by the relative phase of said signals at the outputs of said limiter means.

6. An underwater echo ranging system comprising means for propagating underwater signal pulses of preassigned length and recurrence rate and a receiver system responsive to reverberation and to echoes due to said pulses, said receiver system including an amplifier energized in accordance with said reverberation and echoes, means for varying the gain of said amplifier following the propagation of each of said pulses to increase the gain with time substantially proportionately to the decrease in reverberation intensity with time, means for disabling said gain varying means whenever echo signals of at least a preassigned amplitude are received by said amplifier and means controlling said disabling means for quickly reenabling said gain varying means upon translation of each such echo signals by said amplifier.

7. An echo ranging system comprising means for propating signal pulses of preassigned length and recurrence rate, a receiver system responsive to echoes of said signal pulses, said receiver system comprising an amplifier energized in accordance with such echoes, means for controlling the gain of said amplifier to increase it at a preassigned rate with time following propagation of each of said signal pulses, and means for controlling said gain controlling means to interrupt the gain increase upon receipt by the amplifier of a signal of at least preassigned intensity, for a period of duration substantially equal to said signal pulse length.

8. A signal translating system comprising an amplifier, a condenser associated with the amplifier input for controlling the amplifier gain in accordance with the charge upon said condenser, means for charging said condenser to a preassigned potential, a discharging circuit for said condenser including a resistor, a second condenser of small capacity relative to said first condenser connected in circuit with said resistor to discharge therethrough in the same direction as said first condenser, means for charging said second condenser when the amplifier output exceeds a preassigned amplitude, proportionately to the excess above said preassigned amplitude, and means for limiting the charge which can be placed upon said second condenser.

9. A signal translating system comprising an amplifier, a condenser coupled to the amplifier input circuit for controlling the amplifier gain in accordance with the charge upon said condenser, means for periodically charging said condenser to a preassigned potential, a unidirectionally conductive discharge circuit for said condenser including a resistor, a second condenser of small capacity relative to said first condenser connected in parallel with said resistor, a charging circuit energized in accordance with the amplifier output for charging said second condenser in the direction, when said output increases, to oppose discharge of said first condenser through said resistor, and means for quickly discharging said second condenser to a preassigned value whenever a charge above said value is placed thereon.

10. A signal translating system comprising an amplifier, a condenser coupled to the amplifier to control the gain thereof in accordance with the charge upon said condenser, means for charging said condenser to a preassigned value in the direction to decrease the amplifier gain, a discharge circuit for said condenser including a resistor and a rectifier in series, the positive terminal of said rectifier being connected to said resistor, a second condenser of capacity small relative to that of said first condenser connected across said resistor, a charging circuit for said second condenser energized in accordance with the amplifier output and including a second rectifier having its positive terminal connected to said positive terminal of said first rectifier, means for placing a positive bias upon the negative terminal of said second rectifier, a third rectifier having its positive terminal connected to said positive terminals, and means for placing a negative bias upon the other terminal of said third rectifier.

11. A torpedo steering system comprising a rudder, means for controlling said rudder to turn the torpedo in one or the opposite direction, an echo ranging system for producing signals each of amplitude and polarity determined by the bearing relative to the torpedo, of the region from which echoes received by said ranging system emanate, means including an electrical storage device controlled in accordance with the output of said echo ranging system for selecting from the signals produced by said ranging system due to echoes from a ship and from the ship's wake those emanating from the ship, and means for actuating said controlling means in accordance with the selected signals.

12. A torpedo steering system comprising a rudder, means for controlling said rudder to turn the torpedo in one or the opposite direction, underwater signal responsive means the output of which is a function of the bearing, relative to the torpedo, of the source from which signals received by said signal responsive means emanate, means for selecting from the output of said signal responsive means when said signal responsive means receives signals from two sources having different bearings relative to the torpedo, the components corresponding to the source furthest in one bearing direction, said selecting means comprising an electrical storage device, means for establishing a charge in said device and means for varying said charge in accordance with the output of said signal responsive means, and means for actuating said controlling means in accordance with said components.

13. A steering system for a moving body comprising a steering member, means for actuating said steering member to steer the body in one or the opposite direction, signal transducer means the output of which is of amplitude and polarity determined by the magnitude and sign respectively of the bearing, relative to the body, of the source of signals received by said transducer means, means for resolving the output of said transducer means into resultant signals of amplitude and polarity determined by the magnitude and sign of said bearing, means comprising a condenser and circuit means for establishing a charge upon said condenser in accordance with the resultant signal of greatest magnitude and preassigned polarity, and means for controlling said actuating means in accordance with said charge.

14. A signal translating system comprising signal receiver means, the output of which is dependent upon the bearing, relative to said means, of the source of the signals received thereby, means including a condenser for converting the output of said receiver means into a signal of amplitude determined by the magnitude of said bearing, and means including means for reversibly connecting said condenser with respect to the output of said receiver means for selectively conditioning said converting means to convert, when signals are received by said receiver means from more than one source, only the component of the receiver means output corresponding to the received signal emanating from the source furthest in one bearing direction relative to said receiver means.

15. A signal translating system comprising a pair of signal transducers spatially related so that the relative phase of the outputs thereof for signals received thereby is determined by the bearing, relative to said transducers, of the region from which said signals emanate, means for resolving the outputs of said transducers in combination into a resultant signal at a pair of terminals, of amplitude proportional to the relative phase of said outputs, an impedance, a circuit including said impedance for varying the potential thereacross in accordance with said resultant signal, and means for selectively conditioning said circuit to vary said potential, when signals from two sources differently oriented relative to said transducers are received by the transducers, only in accordance with the component of the output of said resultant signal corresponding to the signal received by said transducer from the source furthest in one bearing direction relative to said transducer, said conditioning means including a unidirectional conductive device in circuit with said impedance and means for connecting said impedance in either polarity relation across said terminals.

16. A signal translating system comprising signal receiver means the output of which is determined by the bearing, relative thereto of the source of the signals received by said means, means for converting the output of said receiver means into a direct current voltage of amplitude proportional to and polarity determined by the sign of said bearing, a condenser, a unidirectionally conductive device, means for placing an initial charge of preassigned amplitude and polarity upon said condenser, circuit means for impressing said direct current voltage upon said condenser and device in series, and means for selectively presetting said circuit means to fix the polarity of said direct current voltage as applied to said condenser and device relative to that of said initial charge.

17. A signal translating system comprising signal receiver means the output of which is determined by the bearing, relative to said means, of the source of the signals received thereby, means for converting the output of said receiver means into a direct current potential of amplitude proportional to and polarity determined by said bearing, a condenser, a normally disabled unidirectionally conductive device, circuit means for impressing said voltage across said condenser and device in series, means for selectively presetting said circuit means to determine the direction in which said voltage is impressed across said condenser and device, means for placing an initial potential of preassigned amplitude and polarity upon said condenser, and means for enabling said device only when signals of at least a preassigned amplitude are received by said receiver means.

18. A signal translating system comprising a pair of signal transducers spatially related so that the relative phase of the outputs thereof is determined by the bearing, relative to the transducers, of the source of signals received thereby, means for resolving the output of the two transducers in combination into a direct current resultant signal of amplitude and polarity determined by said relative phase, a condenser, means for placing an initial charge of preassigned amplitude and polarity upon said condenser, and means for modifying the charge upon said condenser only in accordance with the greatest value and preassigned polarity of said direct current signal within a period of prescribed duration.

19. A signal translating system comprising a pair of signal transducers spatially related so that the relative phase of the outputs thereof is determined by the bearing, relative to the transducers, of the source of signals received thereby, means for resolving the output of the two transducers in combination into a direct current resultant signal of amplitude and polarity determined by said relative phase, a condenser, means for placing an initial charge of preassigned amplitude and polarity upon said condenser, a unidirectionally conductive device, circuit means for impressing said direct current signal across said condenser and device in series, and means for presetting said circuit means to selectively fix the relative polarity of said initial charge and said direct current signal as applied to said condenser and device.

20. A signal translating system in accordance with claim 19 wherein said device normally is disabled, said system comprising means for enabling said device when signals of at least a preassigned amplitude are received by said transducers.

21. A signal translating system comprising a pair of signal responsive transducers related so that the relative output thereof for signals received thereby from a common source is determined by the bearing, relative to the transducers, of said source, a pair of signal channels for each of which a respective transducer constitutes the input element, each of said channels comprising means for suppressing signals of less than a preassigned amplitude supplied to the channels, means for resolving the outputs of the two channels in combination into a resultant direct current signal of amplitude and polarity determined by the relative outputs of said transducers, a condenser, an electron discharge device normally biased so that it is nonconductive, means energized in accordance with the output of one of said channels for overcoming the bias upon said device when signals of at least said preassigned amplitude are received by said one channel, and means for impressing said resultant signal across said condenser and device in series.

22. A signal translating system comprising a pair of signal transmitting channels, means for resolving the outputs of said channels in combination into a resultant direct current signal at a pair of terminals, of amplitude and polarity determined by the relative outputs of the two channels, a condenser connected between said terminals, means for placing an initial charge of prescribed amplitude and polarity upon said condenser and means including a unidirectional conductive device in circuit with said condenser for modifying the charge upon said condenser in accordance with only the component of greatest magnitude and prescribed polarity of said resultant signal appearing during a period of preassigned duration.

23. A signal translating system comprising a pair of signal transmitting channels, means for resolving the outputs of said channels in combination into a resultant direct current signal of amplitude and polarity determined by the relative phase of the outputs of said channels, a condenser, means for placing a charge of preassigned amplitude and polarity upon said condenser, a discharge circuit for said condenser, and meansf or affecting discharge of said condenser through said circuit proportionately to only the component of said direct current signal of greatest magnitude and prescribed polarity appearing during a period of preassigned duration.

24. An echo ranging system comprising means for propagating signal pulses of prescribed length and recurrence rate, means for converting echoes of said pulses into a voltage of amplitude and polarity determined by the bearing of the region from which said echoes emanate, relative to a prescribed point, a first condenser, means for varying the charge upon said condenser in accordance with said voltage for echoes received between successive pulse propagating periods, a second condenser, means for transferring the charge upon said first condenser to said second condenser at a time between successive pulse propagating periods, means for short-circuiting said second condenser momentarily preceding transfer of said charge thereto, and a utilization circuit including said second condenser.

25. An echo ranging system comprising means for propagating signal pulses of prescribed length and recurrence rate, means for converting echoes of said pulses into a voltage of amplitude and polarity determined by the bearing of the region from which said echoes emanate, relative to a prescribed point, a first condenser, means for establishing upon said condenser a charge of amplitude and polarity determined by said voltage, a second condenser, means for connecting said second condenser in circuit with said first condenser following receipt of an echo whereby the charge upon said first condenser is transferred to said second condenser, means for disconnecting said condensers from each other during each pulse propagating period, means for momentarily short-circuiting said second condenser upon receipt of an echo between successive pulse propagating periods and before transfer of said charge thereto, and a utilization circuit including said second condenser.

26. An echo ranging system in accordance with claim 25 comprising means for short-circuiting said second condenser if no echo is received from a signal pulse propagated during a pulse propagating period immediately following such period for which an echo was received.

27. An echo ranging system comprising means for propagating signal pulses of preassigned length and recurrence rate, means responsive to echoes of said pulses for producing a voltage of amplitude and polarity determined by the bearing, relative to a prescribed point, of the region from which such echoes emanate, a first condenser, means for placing a charge of preassigned magnitude and polarity upon said condenser during each pulse propagating period, means for modifying the charge upon said condenser in accordance with said voltage following each pulse of propagating period, a second condenser means for momentarily short-circuiting said second condenser upon receipt of an echo, means for transferring the charge, as modified, upon said first condenser to said second condenser following receipt of an echo, and a utilization circuit including said second condenser.

28. An echo ranging system in accordance with claim 27 comprising means for short-circuiting said second condenser if no echo is received in the interval between two successive pulse propagating periods immediately following such period for which an echo is received.

29. An echo ranging system comprising means for propagating signal pulses, one per each period of a series of periods of preassigned recurrence rate, means responsive to echoes of said pulses for producing a voltage of amplitude and polarity determined by the bearing, relative to a preassigned reference point, of the region from which said echoes emanate, a first condenser, a charging circuit for said condenser effective when closed to place a charge of prescribed amplitude and polarity upon said condenser, a charging relay effective when operated to close said circuit, means for operating said charging relay for a preassigned time during each of said periods, means for modifying the charge on said first condenser in accordance with said voltage, a second condenser, a transfer relay, a shorting relay, a circuit controlled by said transfer relay for connecting said first and second condensers in parallel when said transfer relay operates, a circuit controlled by said shorting relay for short-circuiting said second condenser when said shorting relay operates and said transfer relay is released, means controlled by said echo responsive means for affecting operation of said shorting relay and transfer relay in sequence when an echo is received by said echo responsive means, means for opening the energizing circuit for said shorting relay when said charging relay operates, means for effecting release of said transfer relay in the period next succeeding the time of operation of said transfer relay, and a utilization circuit including said second condenser.

30. An echo ranging system in accordance with claim 29 comprising a circuit controlled by said charging and transfer relays for short-circuiting said second condenser when said charging relay is operated and said transfer relay is released.

31. A torpedo steering system comprising a rudder, means for deflecting said rudder, gyroscope controlled means for controlling said deflecting means to normally steer the torpedo along a prescribed course, an echo ranging system including means for propagating signal pulses at successive periods and means for resolving the echoes received at the torpedo following each of said periods into a control signal, means for actuating said gyroscope controlled means in accordance with each such control signal to effect deflection of the rudder to turn the torpedo toward the region from which said echoes emanate, and means for actuating said gyroscope controlled means to effect return of said rudder to the position corresponding to said prescribed course whenever no echo is received at the torpedo in the interval between successive periods following a period for which an echo is received.

32. A steering system for a moving body comprising a steering member, means for actuating said steering member, means for controlling said actuating means to normally steer the body along a preset course, an echo ranging system including means for propagating signal pulses at successive periods and means for resolving the echoes received between successive periods into a control signal of amplitude and polarity determined by the bearing, relative to the body, of the region from which said echoes emanate, means for controlling said actuating means in accordance with the control signal to turn the body in the direction toward said region, and means for returning said actuating means to control by said first controlling means whenever no echo is received at the body during the interval between two successive periods following a period for which an echo is received.

33. An echo ranging system comprising means for propagating signal pulses at successive periods, means for resolving echoes of said pulses received by the system between each two successive periods into a voltage of amplitude and polarity determined by the bearing, relative to a preassigned point, of the object from which the echoes emanate, a first condenser, means for establishing upon said condenser in the interval between each two successive periods a charge of magnitude and polarity determined by said voltage for that interval, a second condenser, means operable in response to receipt of an echo by the system for connecting said second condenser in circuit with said first condenser, whereby said charge is transferred to said second condenser, means for opening the circuit between said first and second condensers during each of said periods, and means for delaying operation of said circuit opening means in any period following one for which an echo was received until said connecting means has operated.

34. An echo ranging system comprising means for propagating signal pulses at successive periods, means for resolving echoes of said pulses received by the system between each two successive periods into a voltage of amplitude and polarity determined by the bearing, relative to a preassigned point, of the object from which the echoes emanate, a first condenser, means for establishing upon said condenser in the interval between each two successive periods a charge of magnitude and polarity determined by said voltage for that interval, a second condenser, a first relay, a second relay, a third relay, an energizing circuit for said third relay adapted to be closed in response to operation of said second relay, means for operating said second relay in response to receipt of an echo by the system, a short-circuit connection across said second condenser closed when said second relay is operated and said third relay is released, a circuit for connecting said first and second condensers in parallel when said first relay is released and said second and third relays are operated, an energizing circuit for said first relay adapted to be closed only when said third relay is released, and means for impressing an energizing voltage upon said energizing circuit for said first relay during each of said periods.

35. A torpedo steering system comprising a rudder, actuating means for controlling said rudder to turn the torpedo in one or the opposite direction, a control circuit for said actuating means for determining the direction and extent of torpedo turn in accordance with the polarity and amplitude of the potential extent across a portion of said circuit, means for propagating underwater signal pulses at successive periods, means for resolving echoes of said pulses received at the torpedo in the interval between each two successive periods into a voltage of amplitude and polarity determined by the bearing, relative to the torpedo, of the object from which the echoes emanate, a first condenser, means for establishing upon said condenser in the interval between each two successive periods a charge of magnitude and polarity determined by said voltage for that interval, a second condenser, a first relay, a second relay, a third relay, an energizing circuit for said third relay adapted to be closed in response to operation of said second relay, means for operating said second relay in response to receipt of an echo by the system, a short-circuit connection across said second condenser closed when said second relay is operated and said third relay is released, a circuit for connecting said first and second condensers in parallel when said first relay is released and said second and third relays are operated, follow-up potentiometer means for producing a potential of amplitude and polarity determined by the extent and direction of torpedo turn from a preassigned position, said second condenser and said potentiometer means being connected to said control circuit in such relation as to produce opposing potential components across said portion of said control circuit, means associated with said potentiometer means for opening said energizing circuit for said third relay whenever said potentiometer means is at a position other than that corresponding to said preassigned position, an energizing circuit for said first relay adapted to be closed only when said third relay is released, and means for impressing an energizing voltage upon said energizing circuit for said first relay during each of said periods.

36. A torpedo steering system in accordance with claim 35 comprising means for returning said potentiometer means to the position corresponding to said preassigned position when said third relay is released and said second relay is operated.

37. A steering system for a moving body comprising a steering member, actuating means for said member, control means for said actuating means for determining the direction of deflection of the body by said member, said control means including a rotatable member the direction of rotation of which from a preassigned position determines the direction of deflection of the body, a pair of driving members for rotating said rotatable member in one direction or the other in accordance with which driving member is associated with said rotatable member, a pair of clutches, each associated with a respective driving member and effective when operated to associate the respective driving member with said rotatable member, a control circuit for operating one or the other of said clutches in accordance with the polarity of the potential extent across a portion of said control circuit, signal responsive means for producing a voltage of polarity determined by the bearing, relative to the body, of the source from which signals received by said signal responsive means emanate, and means for controlling the polarity of said potential in accordance with the polarity of said voltage.

38. A steering system for a moving body comprising a steering member, actuating means for controlling said member to turn the body in one or the opposite direction, control means for said actuating means, including a circuit, for determining the direction of turn of the body in accordance with the polarity of the potential extent across a portion of said circuit, an impedance, signal responsive means for producing across said impedance a control voltage of polarity and amplitude determined by the bearing, relative to the body, of the source from which signals received by said signal responsive means emanate, a condenser, means for placing a charge of preassigned amplitude and polarity upon said condenser, a discharge circuit for said condenser including said impedance and a unidirectionally conductive device in series relation, means for connecting said device in one or the other polarity relation with said impedance to determine the direction of discharge of said condenser through said impedance, whereby when signals are received by said signal responsive means from several sources at different bearings relative to the body the charge upon said condenser will be modified only in accordance with the component of said control voltage corresponding to the signal emanating from the source furthest in one bearing direction relative to the body, means for translating the condenser charge as modified into a voltage of corresponding polarity across said portion of said first circuit, and means for presetting said connecting means and said translating means to effect operation of said steering to steer the body in the direction toward said source furthest in said one bearing direction.

References Cited in the file of this patent

UNITED STATES PATENTS

| | | |
|---|---|---|
| 1,744,935 | Van Derpol | Jan. 28, 1930 |
| 2,167,492 | Sproule | July 25, 1939 |
| 2,193,868 | Geiger | Mar. 19, 1940 |
| 2,335,265 | Dodington | Nov. 30, 1943 |
| 2,361,648 | Petty | Oct. 31, 1944 |
| 2,374,204 | Hoover | Apr. 24, 1945 |
| 2,382,058 | Hull | Aug. 14, 1945 |
| 2,409,632 | King | Oct. 22, 1946 |
| 2,435,960 | Fyler | Feb. 17, 1948 |
| 2,449,358 | Zappacosta | Sept. 14, 1948 |
| 2,461,120 | Loughlin | Feb. 8, 1949 |
| 2,467,486 | Krumhansl et al. | Apr. 19, 1949 |